Figure 1:
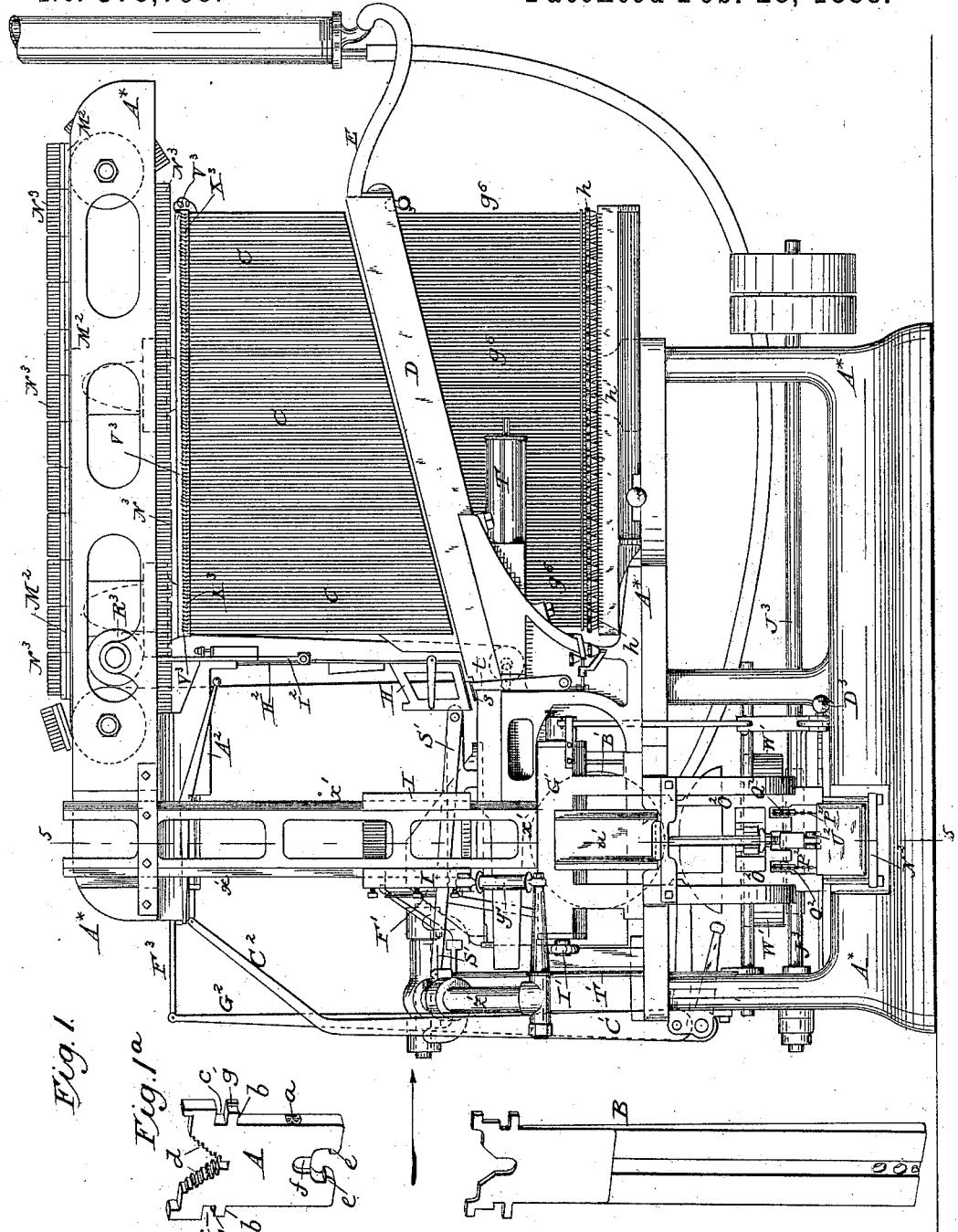

(No Model.) 17 Sheets—Sheet 1.

O. MERGENTHALER.
MACHINE FOR PRODUCING TYPE BARS.

No. 378,798. Patented Feb. 28, 1888.

Witnesses:
S. P. Hollingsworth
W. H. Shipley

Inventor
Ottmar Mergenthaler
By Philip T. Dodge
Attorney (No Model.) 17 Sheets—Sheet 2.
O. MERGENTHALER.
MACHINE FOR PRODUCING TYPE BARS.

No. 378,798. Patented Feb. 28, 1888.

Witnesses:
Inventor
Ottmar Mergenthaler
By Phil. T. Dodge
Attorney.

(No Model.) 17 Sheets—Sheet 3.

O. MERGENTHALER.
MACHINE FOR PRODUCING TYPE BARS.

No. 378,798. Patented Feb. 28, 1888.

Witnesses:
H. Hollingsworth
W. H. Shipley.

Inventor
Ottmar Mergenthaler.
By Philip T. Dodge,
Attorney.

(No Model.) 17 Sheets—Sheet 4.
O. MERGENTHALER.
MACHINE FOR PRODUCING TYPE BARS.
No. 378,798. Patented Feb. 28, 1888.
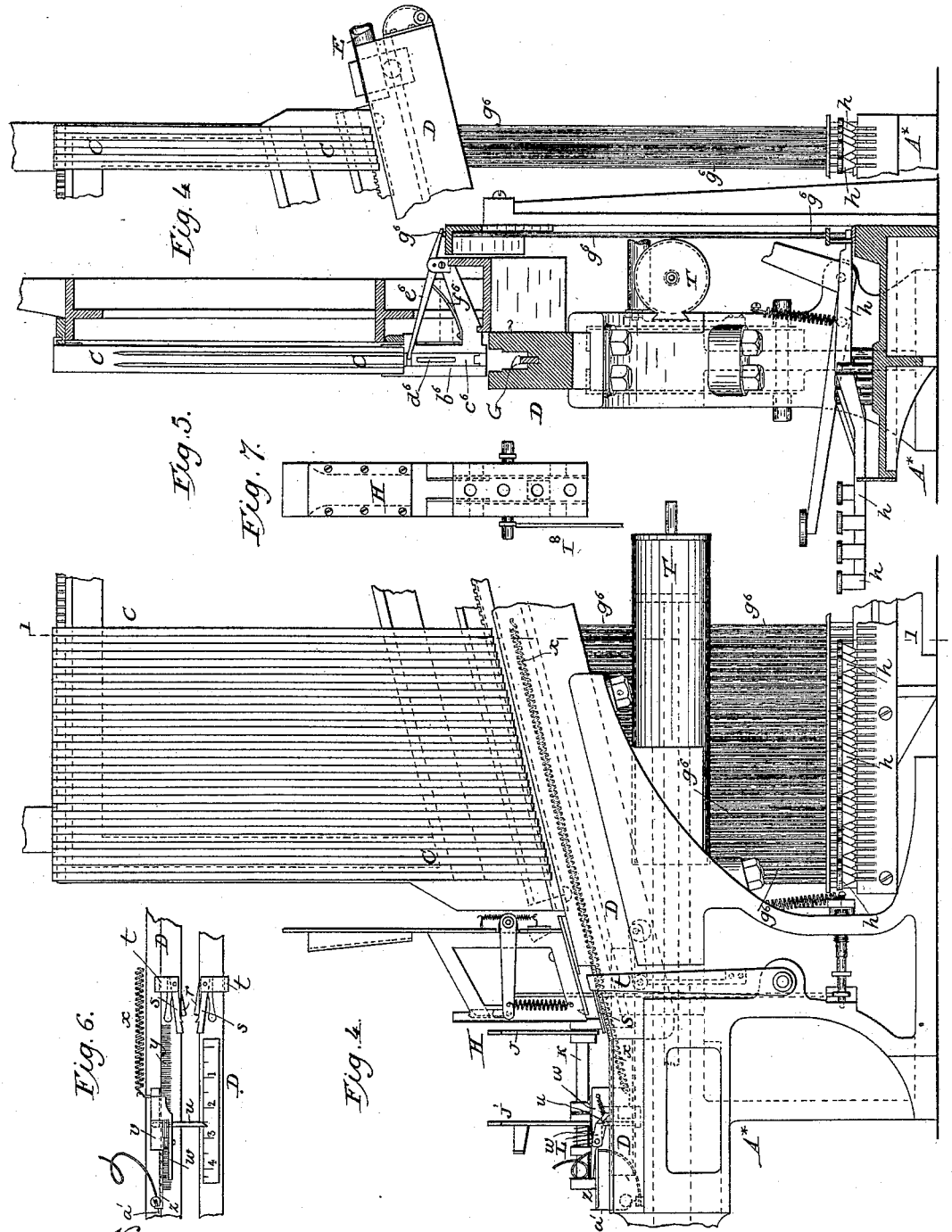
Witnesses:
S. C. Hollingsworth
N. H. Shipley.
Inventor:
Ottmar Mergenthaler.
By Philip T. Dodge.
Attorney.

(No Model.) 17 Sheets—Sheet 5.
O. MERGENTHALER.
MACHINE FOR PRODUCING TYPE BARS.
No. 378,798. Patented Feb. 28, 1888.
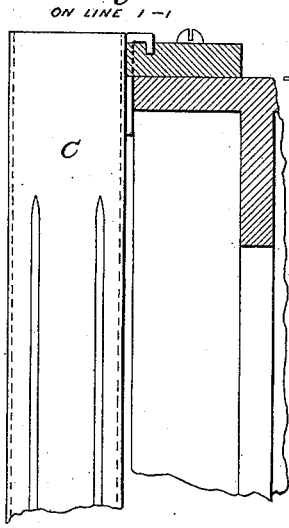
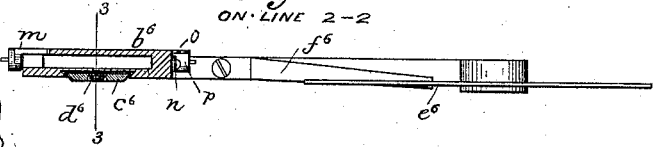
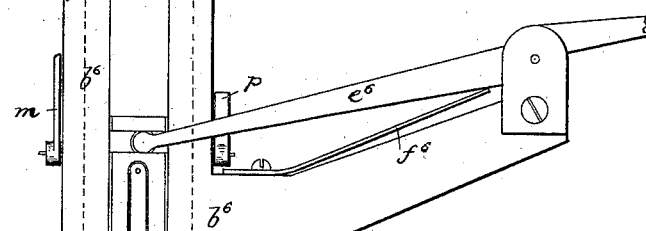
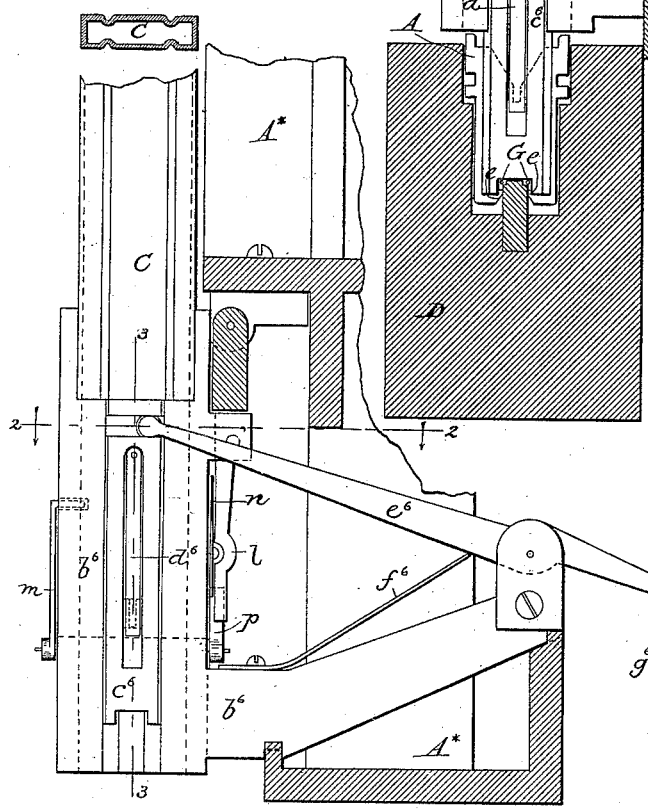
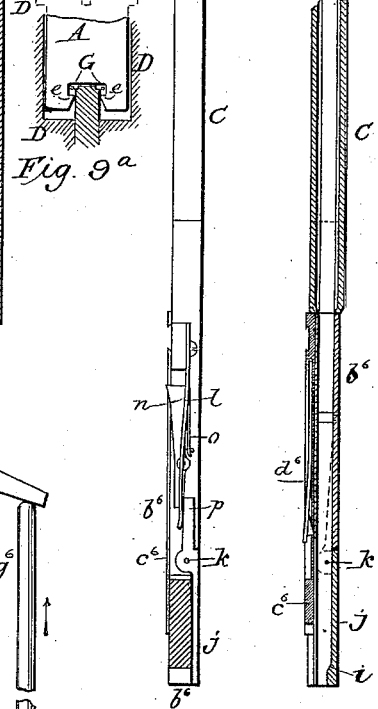
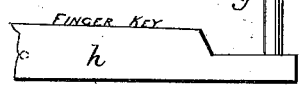
Witnesses:
L. Hollingsworth
W. H. Shipley
Inventor
Ottmar Mergenthaler,
By Philip T. Dodge
Attorney

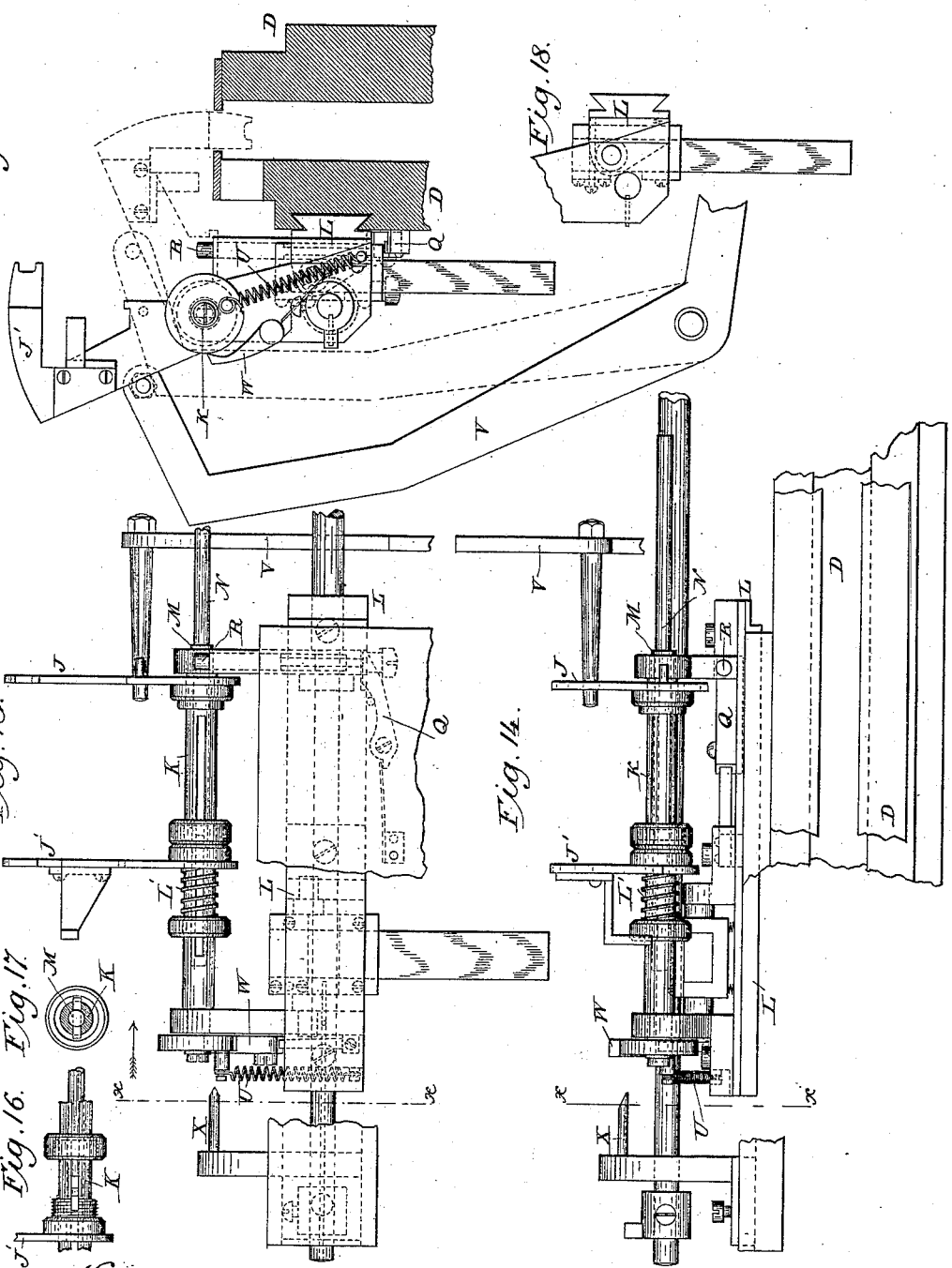

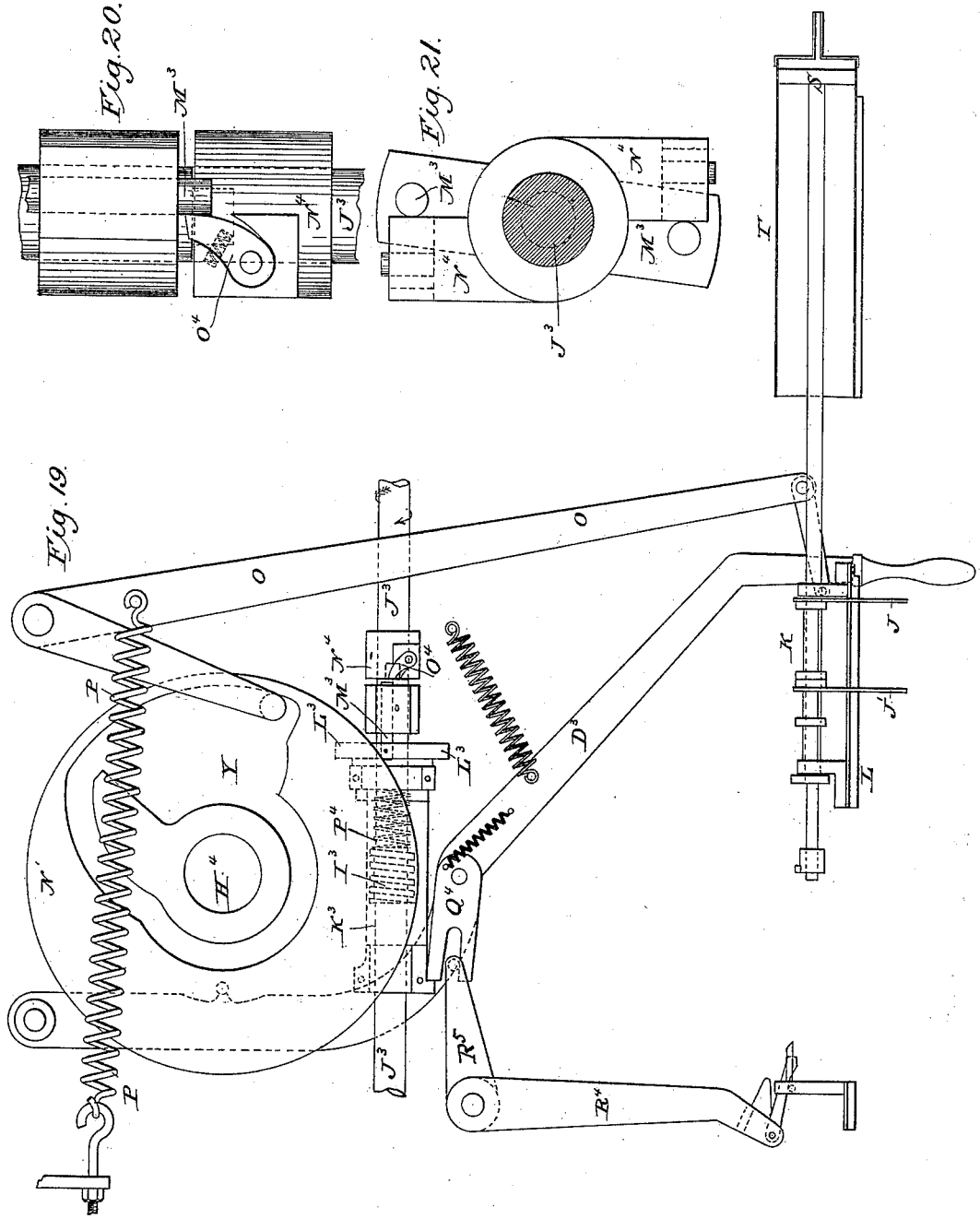

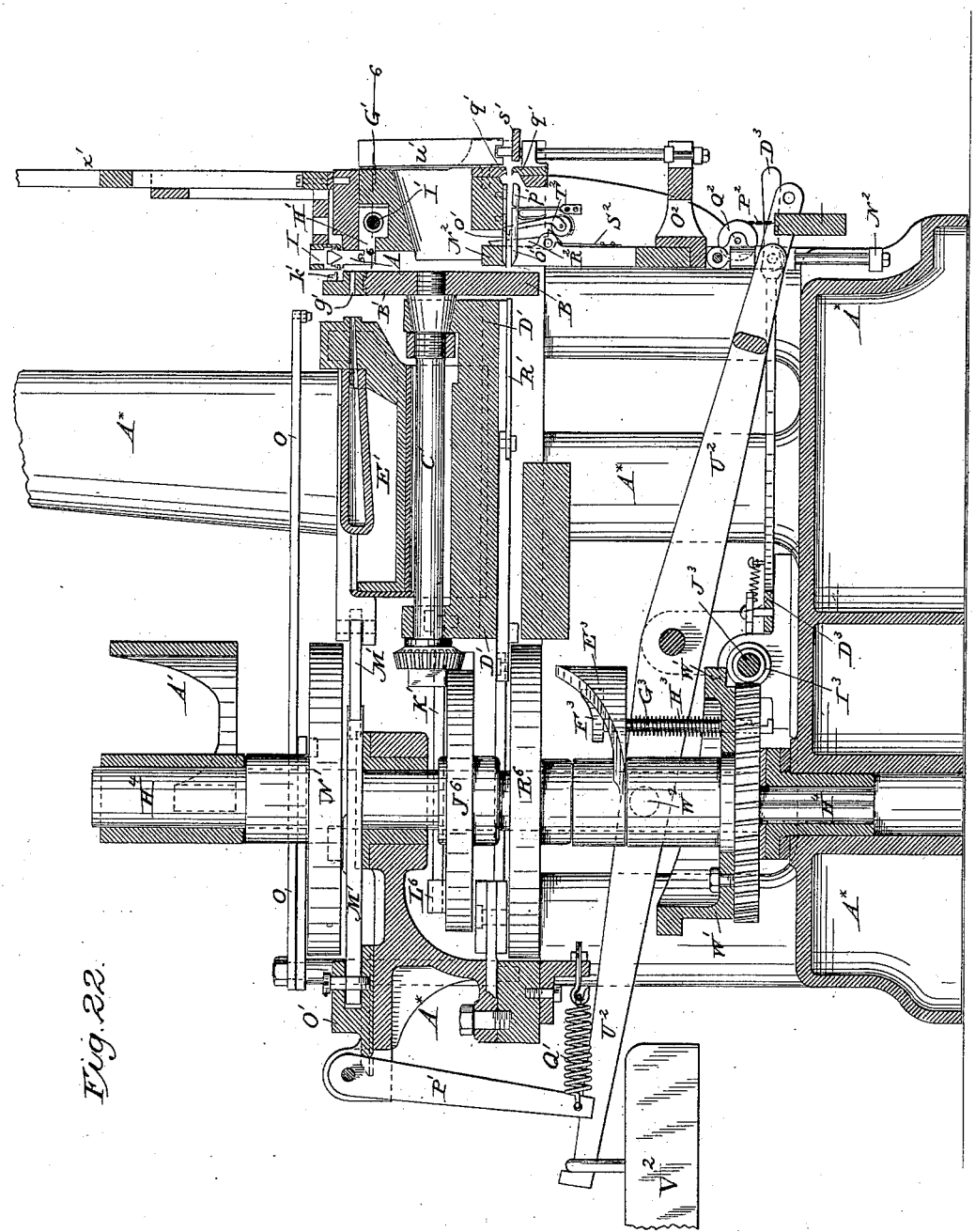

(No Model.) 17 Sheets—Sheet 9.

O. MERGENTHALER.
MACHINE FOR PRODUCING TYPE BARS.

No. 378,798. Patented Feb. 28, 1888.

Witnesses,

Inventor
Ottmar Mergenthaler.
By Philip T. Dodge,
Attorney.

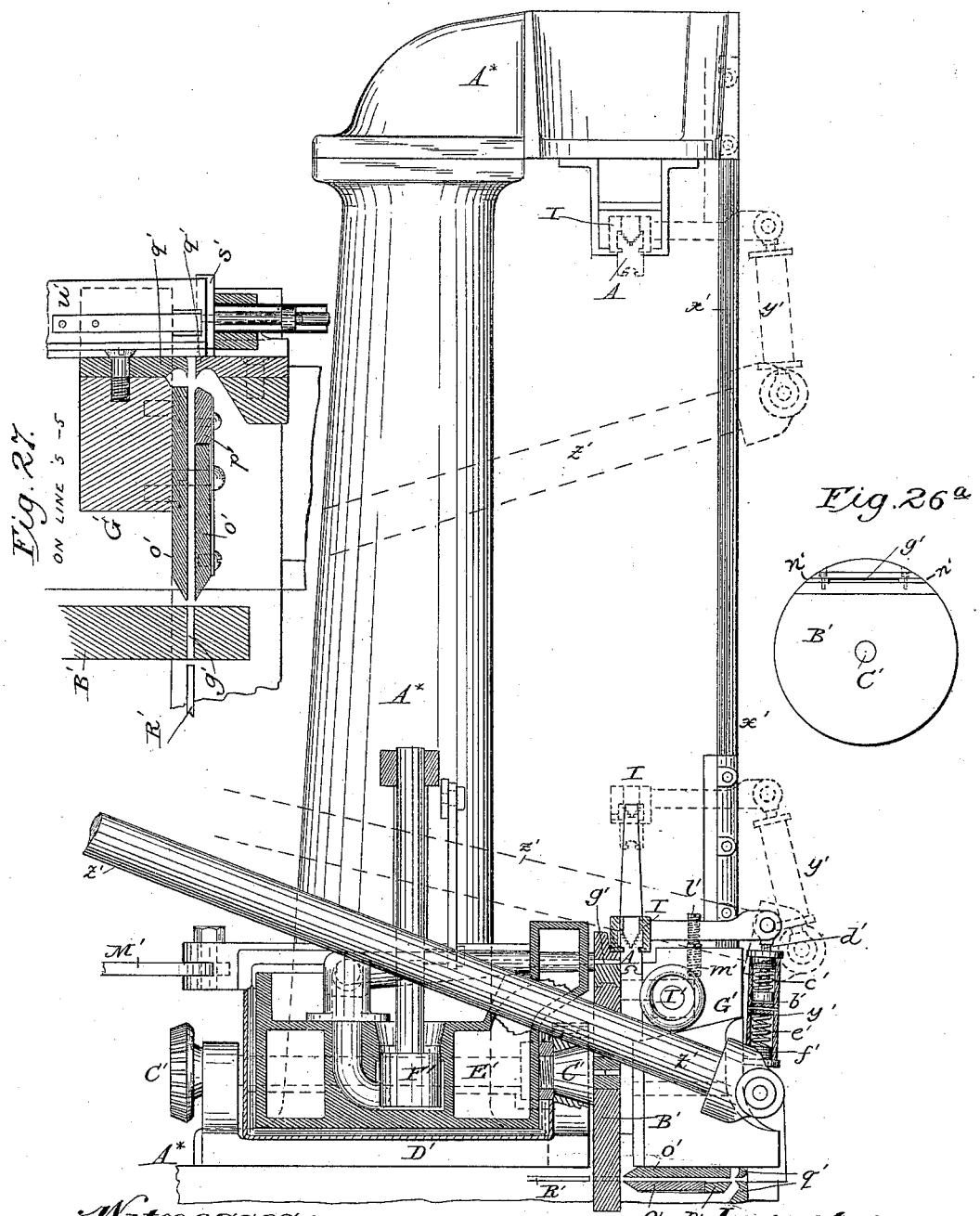

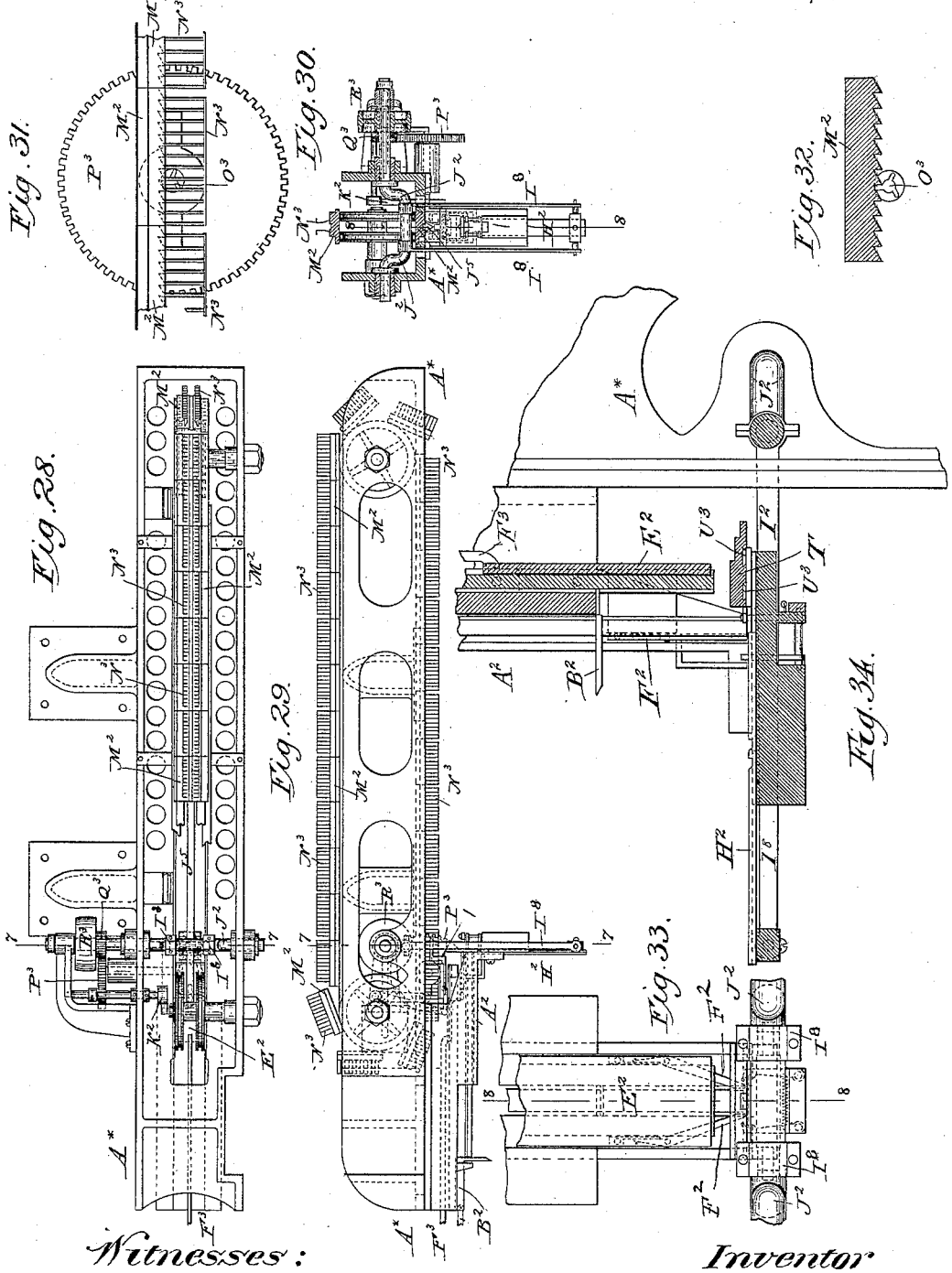

(No Model.) 17 Sheets—Sheet 12.
O. MERGENTHALER
MACHINE FOR PRODUCING TYPE BARS.
No. 378,798. Patented Feb. 28, 1888.

Witnesses:
Inventor
Ottmar Mergenthaler
By Philip T. Dodge
Attorney (No Model.) 17 Sheets—Sheet 13.

O. MERGENTHALER.
MACHINE FOR PRODUCING TYPE BARS.

No. 378,798. Patented Feb. 28, 1888.

Witnesses:
H. P. Hollingsworth
W. H. Shipley.

Inventor:
Ottmar Mergenthaler.
By his Atty.
Attorney.

(No Model.) 17 Sheets—Sheet 14.
O. MERGENTHALER.
MACHINE FOR PRODUCING TYPE BARS.
No. 378,798. Patented Feb. 28, 1888.
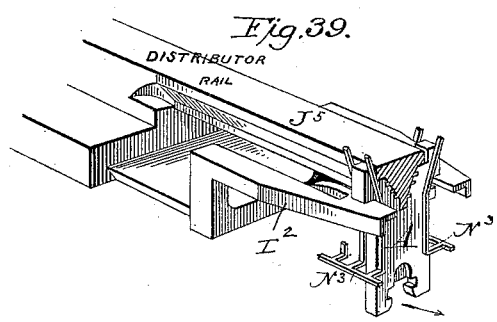
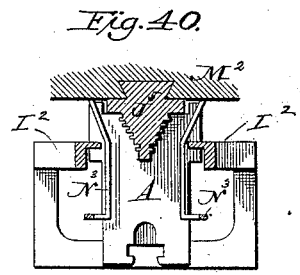
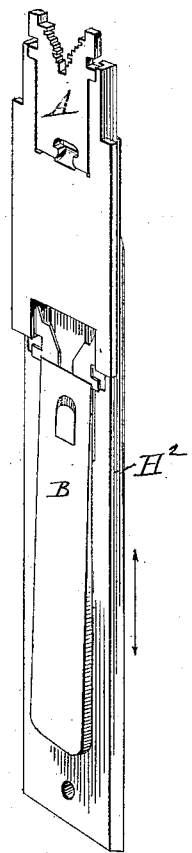
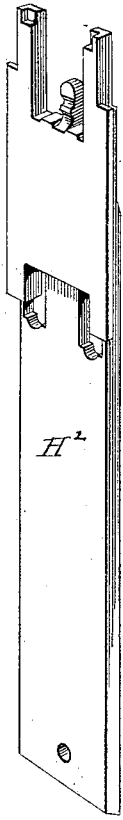
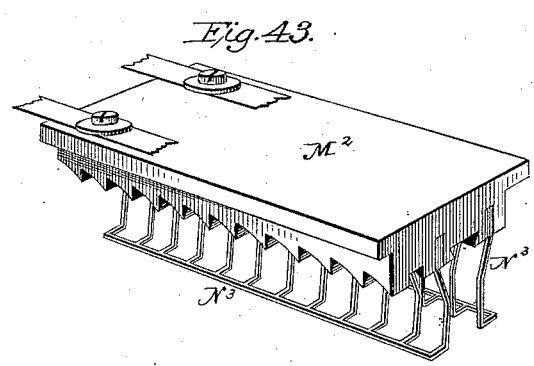
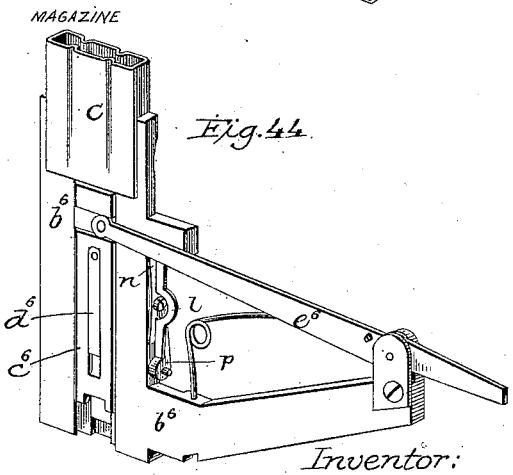
Witnesses:
James P. DuHamel
J. P. Hollingsworth
Inventor:
Ottmar Mergenthaler,
By his Atty.
Phil. T. Dodge.

(No Model.)
O. MERGENTHALER.
MACHINE FOR PRODUCING TYPE BARS.
No. 378,798. Patented Feb. 28, 1888.
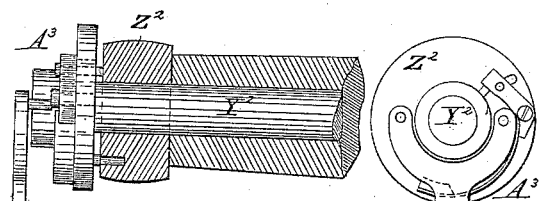
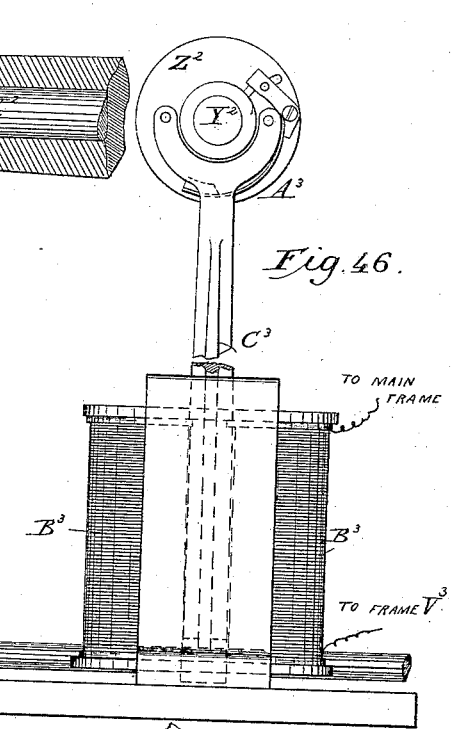
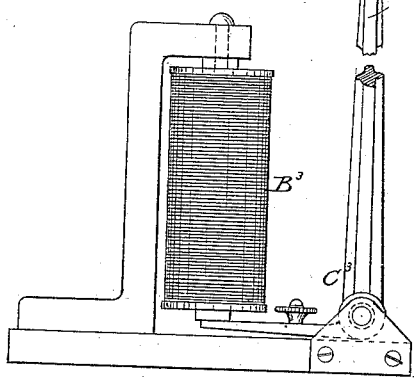
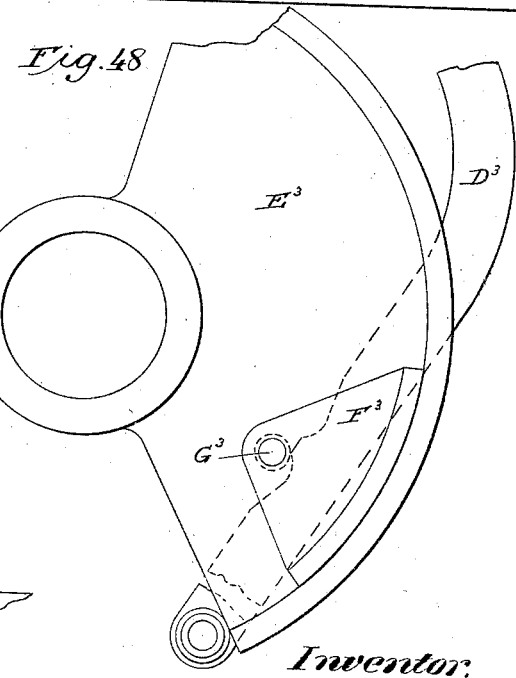
Witnesses:
S. P. Hollingsworth
W. H. Shipley
Inventor:
Ottmar Mergenthaler
By Philip T. Dodge
Attorney

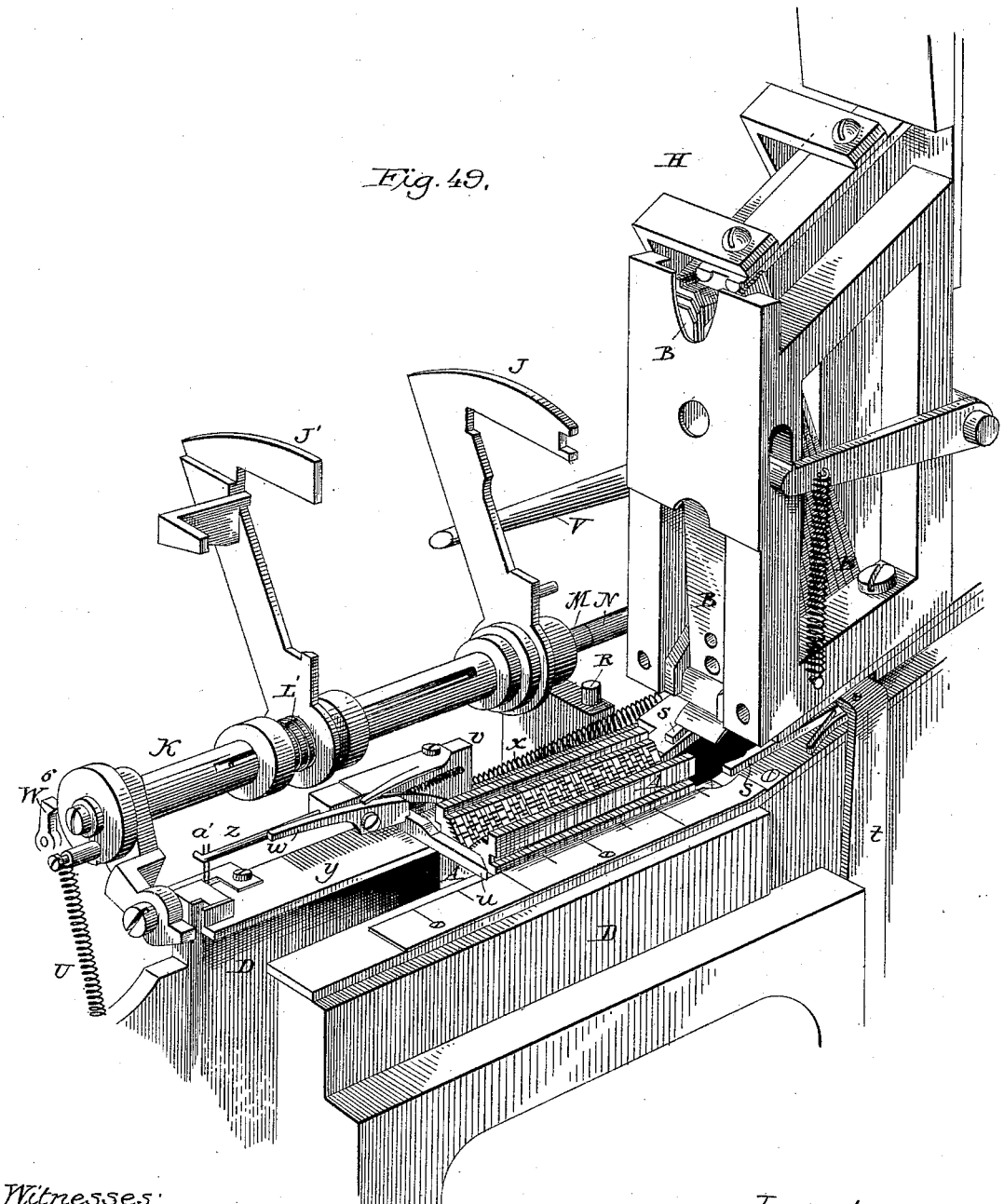

(No Model.) 17 Sheets—Sheet 17.
O. MERGENTHALER.
MACHINE FOR PRODUCING TYPE BARS.

No. 378,798. Patented Feb. 28, 1888.

Witnesses:
James F. Duhamel.
H. P. Hollingsworth.

Inventor:
Ottmar Mergenthaler.
By his Atty.
Philip T. Dodge

UNITED STATES PATENT OFFICE.

OTTMAR MERGENTHALER, OF BALTIMORE, MARYLAND.

MACHINE FOR PRODUCING TYPE-BARS.

SPECIFICATION forming part of Letters Patent No. 378,798, dated February 28, 1888.

Application filed July 17, 1886. Serial No. 208,296. (No model.) Patented in England August 17, 1886, No. 10,525; in France August 17, 1886, No. 178,024; in Belgium August 17, 1886, No. 74,246; in Austria-Hungary August 17, 1886, No. 32,393 and No. 62,490; in Italy August 17, 1886, Nos. 20,405/384, and in Spain August 17, 1886, Nos. 1,262/6,207.

*To all whom it may concern:*

Be it known that I, OTTMAR MERGENTHALER, of the city of Baltimore and State of Maryland, have invented certain Improvements in Machines for Producing Type-Bars, &c., (patented in Great Britain August 17, 1886, No. 10,525; in France August 17, 1886, No. 178,024; in Belgium August 17, 1886, No. 74,246; in Austria-Hungary December 6, 1886, filed August 17, 1886, No. 32,393 and No. 62,490; in Italy September 30, 1886, filed August 17, 1886, Nos. 20,405/384; in Spain September 18, 1886, filed August 17, 1886, Nos. 1,262/6,207,) of which the following is a specification.

My invention has reference more especially to that class of machines represented in various patents heretofore issued to me, and in applications for patents now pending which are designed to produce type-bars, each bearing in one edge, in relief, properly spaced or justified, a series of characters adapted to print a number of words.

The machine, like its predecessors, consists, essentially, of a series of matrices or type; magazine-tubes to contain said matrices; a finger-key mechanism by which the matrices are delivered one at a time; a guide or channel to receive the matrices as they are delivered from the magazine; a blast mechanism for advancing the delivered matrices to the point of assemblage; expanding space-bars and mechanism for introducing them at suitable points into the line of matrices; mechanism for transferring the assembled matrices and space-bars to the face of the mold and confining them closely against the same; mechanism for delivering molten metal or its equivalent into the mold, producing therein the required type-bar, and, finally, mechanism for discharging the type-bar, delivering the matrices to a distributing mechanism, and distributing them to the magazine-tubes from which they started.
The present invention relates to improvements in the various mechanisms above described, having in view greater simplicity and certainty of action and a higher operative speed.
While all the improvements are designed more particularly for a machine adapted to produce type-bars, it will be understood, after the reading of the specification, that many of the features are adapted for use in machines organized for other purposes—such, for example, as machines using type of the male order for the purpose of forming papier-maché or other stereotype matrices, whether in line or page form.

Figure 2:
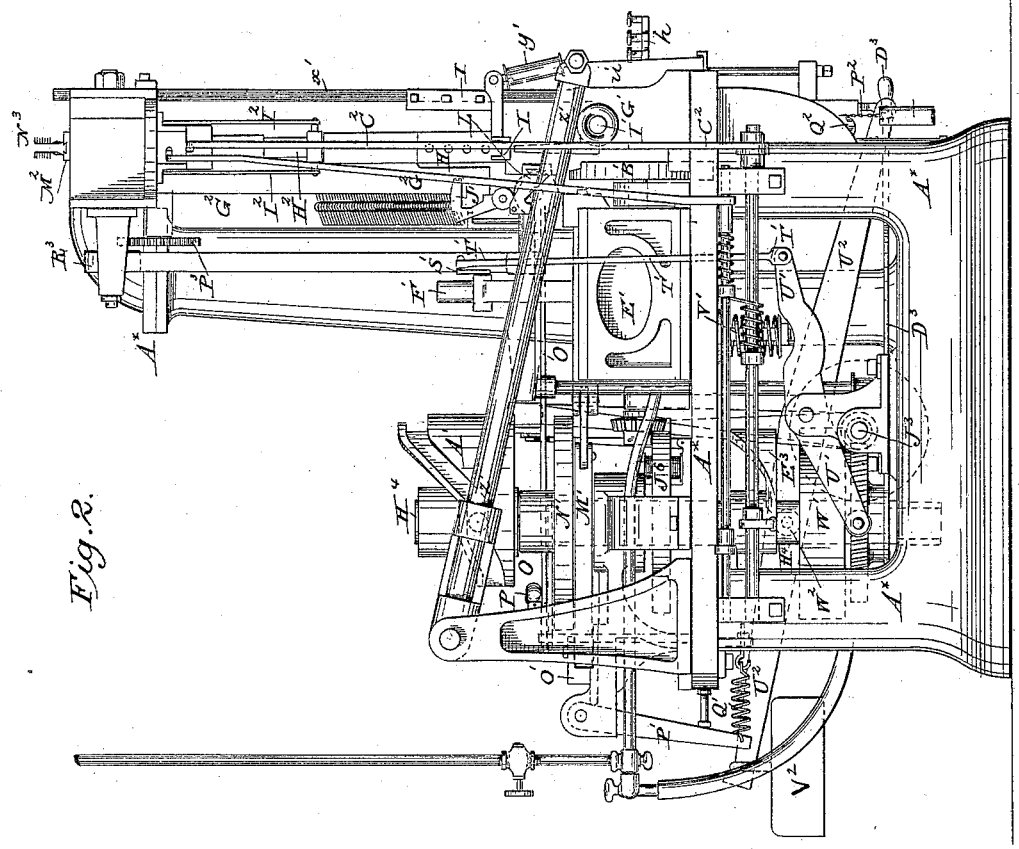
Figure 5:
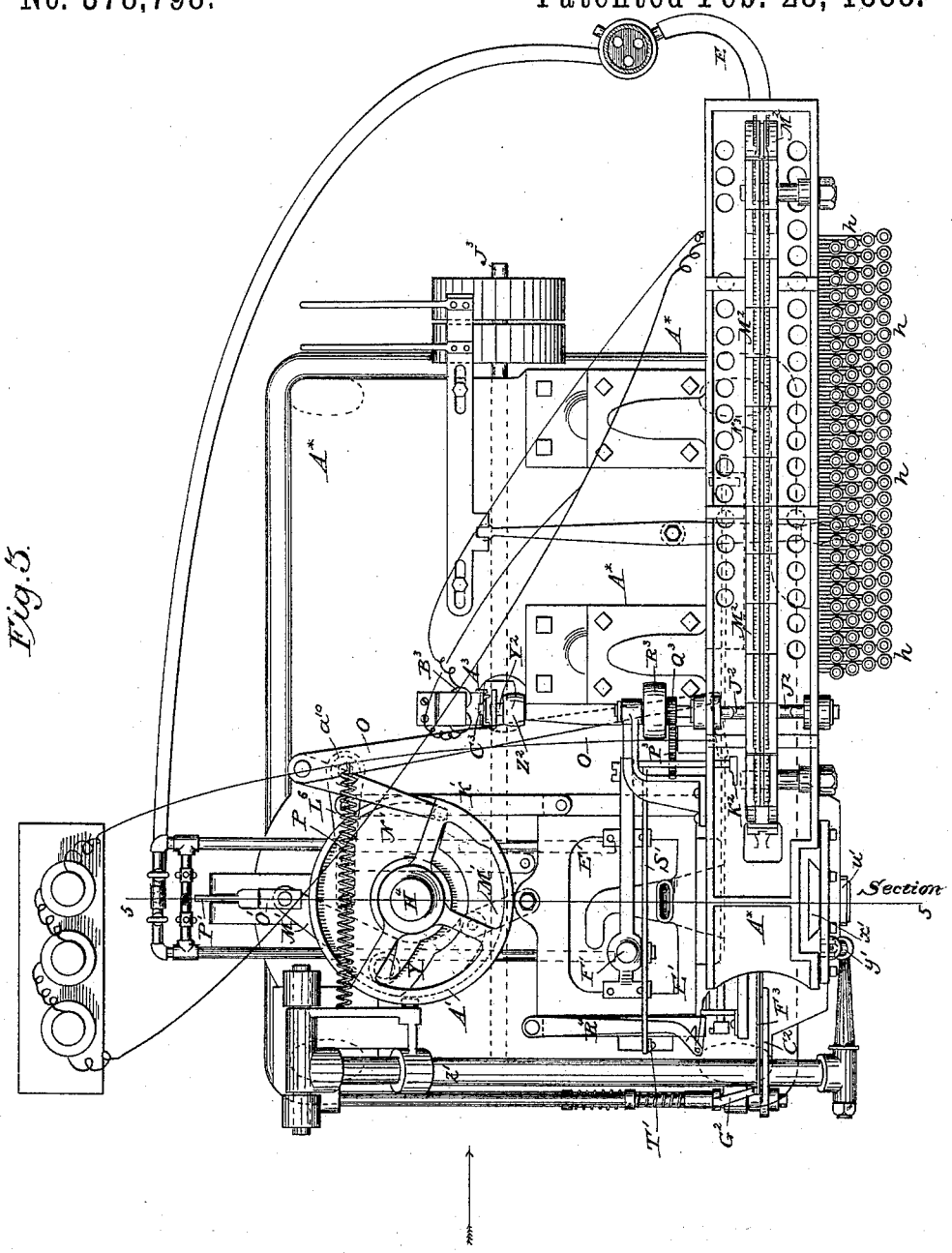
Figure 23:
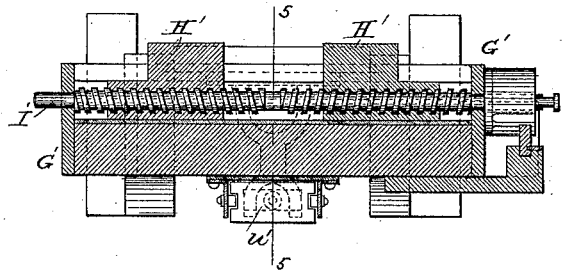
Figure 24:
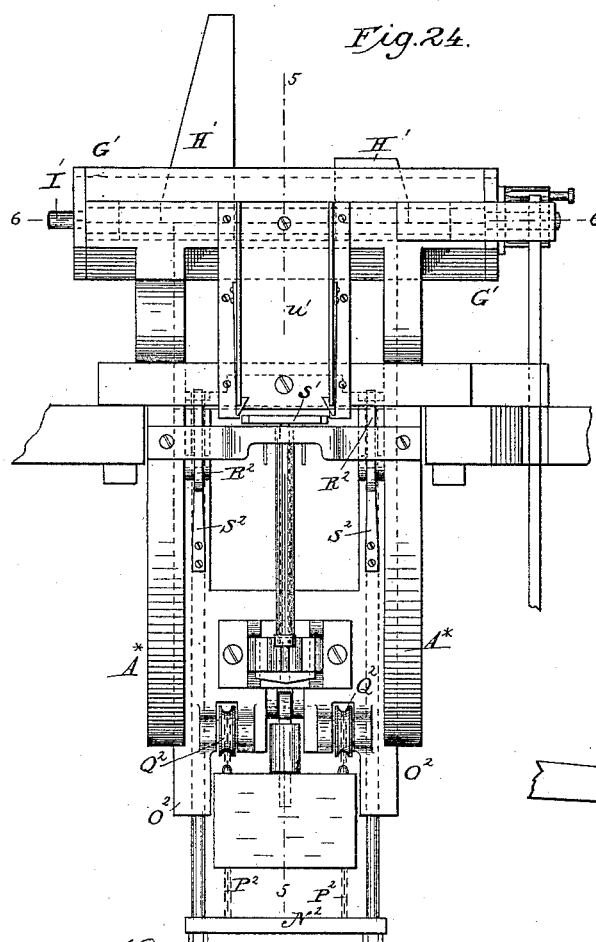
Figure 25:
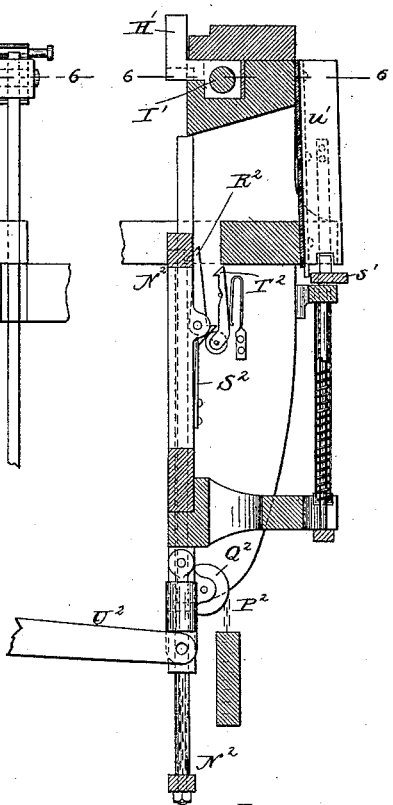
Figures 35, 36:
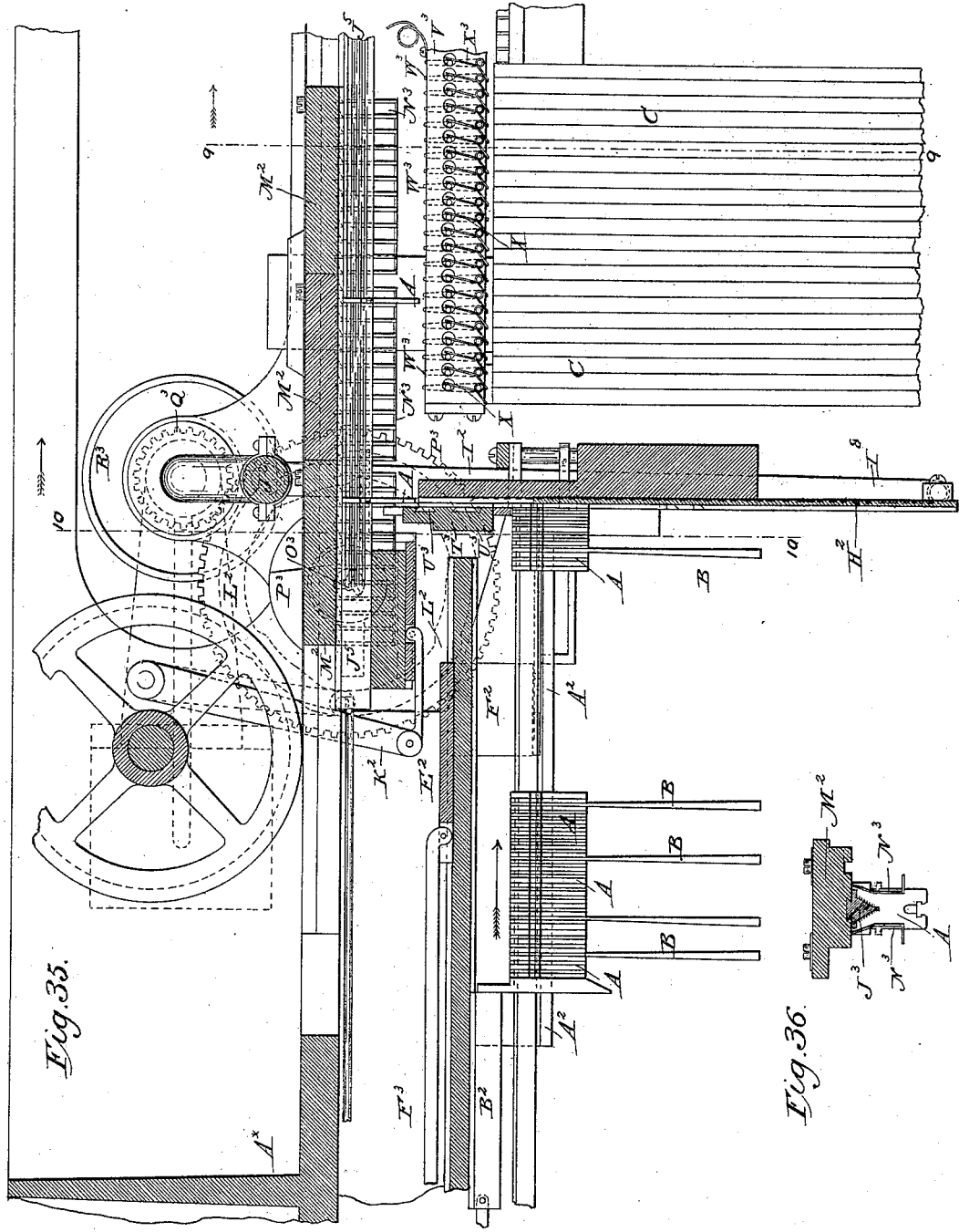
Figure 38:
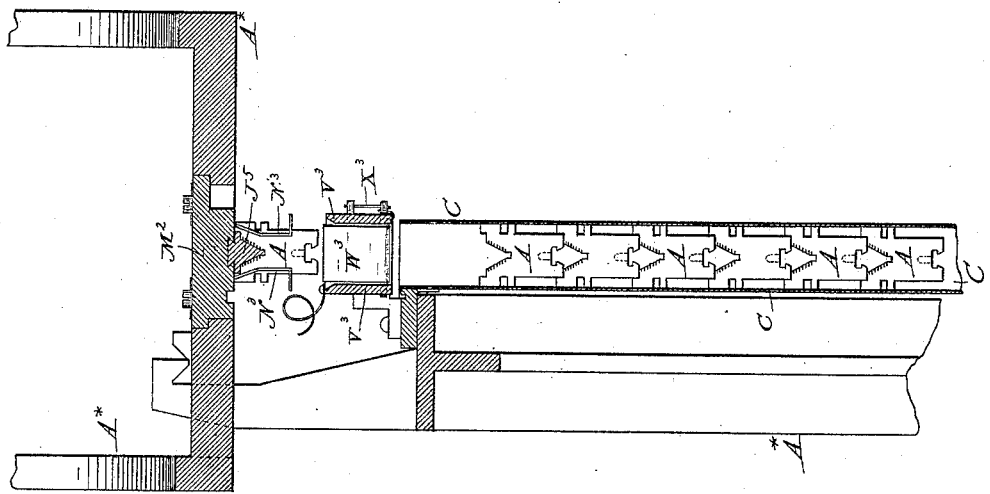
Figure 37:
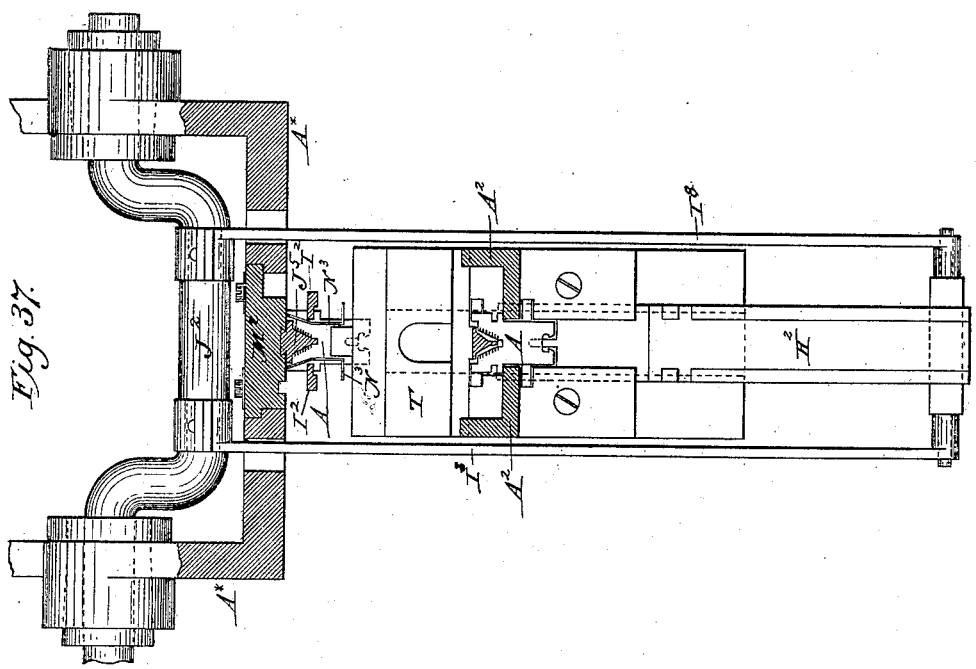
Figure 50:
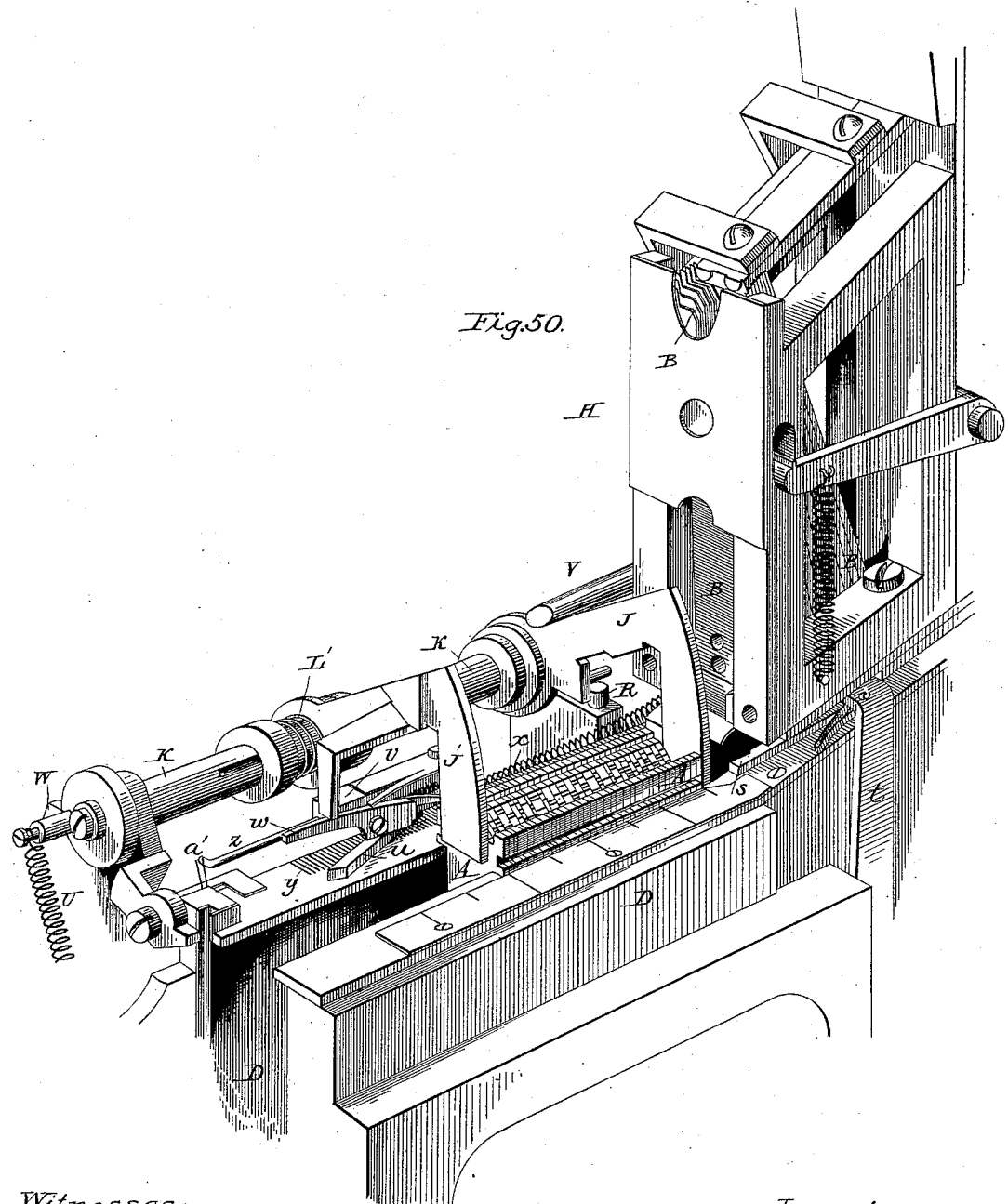

In the accompanying drawings, Figure 1 is a side elevation of the entire machine. Fig. 2 is an end elevation of the same, looking in the direction indicated by the arrow in Fig. 1. Fig. 3 is a top plan view of the machine. Figs. 1ª and 1ᵇ show, respectively, a matrix and a space-bar. Fig. 4 is a front elevation, on a larger scale, of a portion of the magazine-tubes, the finger-keys, and adjacent parts. Fig. 5 is a cross-section on the line 1 1. Fig. 6 is a top plan view of a portion of the rails on which the matrices are assembled. Fig. 7 is a face view of a mechanism for delivering the space-bars to the line of matrices. Fig. 8 is a vertical cross-section on the line 1 1 of Fig. 4, showing the finger-key connections for delivering the matrices therefrom, the parts being in their normal position. Fig. 9 is a side view of the same, showing the feed devices depressed and in the act of delivering the matrix to the guide or channel. Fig. 9ª is a cross section showing the longitudinal wires which hold the matrices in the guide. Fig. 10 is a horizontal cross-section on the line 2 2 of Fig. 8, looking downward. Fig. 11 is an edge view of one of the magazine-tubes and the feed devices at its lower end. Fig. 12 is a vertical transverse section of the same on the line 3 3 of Figs. 8 and 10. Fig. 13 is a front elevation of the mechanism by which the assembled matrices are transferred laterally to the supporting devices, which present them in succession to the casting and distributing mechanism. Fig. 14 is a top plan view of the parts shown in the succeeding figure. Fig. 15 is a vertical cross-section on the line *x x* of the two preceding figures. Figs. 16, 17, and 18 are details of the foregoing parts. Fig. 19 is a top plan view showing in outline the arrangement of the transfer devices shown in Figs. 13 to 18 and the mechanisms for operating the same. Figs. 20 and 21 are respectively a top plan view and an end view of the driving-clutch shown in the preceding figure. Fig. 22 is a vertical cross-section through the entire casting mechanism and adjacent parts on the line 5 5 of Figs. 1 and 3. Fig. 23 is a horizontal cross-section through the matrix-clamping mechanism on the line 6 6 of the preceding figure. Fig. 24 is a front elevation of the clamping and justifying mechanism and the galley which receives the finished bars. Fig. 25 is a vertical cross-section on the line 5 5 of Figs. 1, 2, 23, and 24. Fig. 26 is an end elevation, partly in cross-section, on the line 5 5, showing particularly the connections through which the assembled matrices are lowered and raised. Fig. 26ª is a face view of the mold-wheel. Fig. 27 is a cross-section, also on the line 5 5, showing the parts in the position occupied at the instant of the delivery of a finished bar. Fig. 28 is a top plan view of the entire distributing mechanism. Fig. 29 is a side elevation of the same. Fig. 30 is a vertical cross-section of the same on the line 7 7 of the preceding figure. Fig. 31 is a side elevation showing the means for driving the carrier-plates of the distributer. Fig. 32 is a vertical section illustrating the same features. Fig. 33 is a top plan view of the lifting devices by which the matrices are transferred to the distributing devices proper. Fig. 34 is a vertical cross-section on the line 8 8 of the preceding figure. Fig. 35 is a longitudinal vertical section through one end of the distributing mechanism on a larger scale. Fig. 36 is a vertical cross-section of the distributer-bar and carrier-plate on the line 9 9 of the preceding figure. Fig. 37 is a vertical cross-section on the line 10 10 of Fig. 35. Fig. 38 is a similar section on the line 9 9. Fig. 39 is a perspective view of a portion of the devices for transferring the matrices to the distributer-rail. Fig. 40 is a cross-section of the parts shown in the preceding figure. Fig. 41 is a perspective view of the vertical slide by which the matrices are lifted to the distributer-rail, said parts being shown in position therein. Fig. 42 is a perspective view of the empty slide. Fig. 43 is a perspective view of one of the carrier-plates by which the matrices are moved along the distributer-rail. Fig. 44 is a perspective view of one of the magazine-tubes and the devices for discharging the matrices therefrom. Fig. 45 is a side elevation, and Fig. 46 an end elevation, of the distributer driving-clutch and the magnetic devices for controlling the same. Fig. 47 is a side elevation, and Fig. 48 a plan view, of the safety devices by which the driving-clutch is thrown out of action when the advance of the matrices toward the distributer is arrested. Figs. 49 and 50 are perspective views of the arms and adjacent parts by which the assembled matrices are transferred horizontally to the devices for presenting them to the casting mechanism.

*Matrices and space-bars.*—As the basis of my machine I provide a series of matrices, A, such as represented in Fig. 1ª, each consisting of a metal plate bearing in one edge an intaglio character, $a$. These matrices are in their general form and construction similar to those represented in my applications heretofore filed, particularly that filed on the 23d day of March, 1886, Serial No. 196,270. Each one is provided at opposite edges with supporting-shoulders $b$ and transverse notches $c$, in the upper end with a central notch having teeth $d$ to co-operate with the distributer-rail, and at the bottom with a notch having side shoulders, $e$, to engage the wires by which the matrices are retained in the guide or conductor while moving from the magazines to the point of assemblage. The matrices are made of different thicknesses, according to the widths of the characters which they bear; but in order that they may be properly separated and transferred to the distributer all matrices in the series, regardless of their thickness at their points, are reduced to a common thickness at the central point, $f$, at the lower end, substantially as shown in my previous application. The present matrices differ, however, from those heretofore represented in that their upper ends are provided with shoulders $g$, which are also of uniform thickness throughout the series.

For properly spacing or justifying the matrices when assembled in line, I provide a series of space-bars, B, such as represented in Fig. 1ᵇ. These bars, consisting of two wedge-like portions, are arranged to slide one upon the other, so that their vertical faces are at all times parallel. In construction they are substantially identical with those represented in the application above referred to and are not claimed as a part of the present invention.

*Main frame.*—A* represents the main frame, consisting of a suitable base, a bed-plate sustained by clamps thereon, and suitable standards for supporting the distributer in an overhead position. Its various parts are rigidly connected with each other, and may be made either in the form represented in the drawings or of any other suitable form adapted to give support to the various operative parts, which will be hereinafter explained.

*The magazine*—The magazine to contain the matrices consists of a series of vertical tubes, C, secured rigidly in position by a frame-work of any suitable character, their upper ends being open, that they may receive the matrices from the distributer above, and their lower ends being provided with a common mechanism, to be presently described, for discharging the matrices one at a time. These tubes may be identical in construction and supported in the same manner as those represented in application Serial No. 196,270. The lower end of each magazine-tube is provided with a discharging mechanism, commonly designated the "key mechanism," such as represented in Figs. 5, 8 to 12, and 44. The end of the tube C is secured to a plate, $b^6$, having therethrough a vertical opening forming a continuation of the tube, and in one side this plate is provided with a vertical dovetailed groove containing a slide, $c^6$, carrying a spring-finger, $d^6$. This finger, as shown in Figs. 10 and 12, projects through a vertical slot into the interior passage and is beveled on its upper face, so that as the slide moves upward the tooth will ride over the lowermost matrix and engage over its upper end. When the slide moves downward, the tooth will force the matrix downward and expel it in a positive manner. The depression of the slide is effected by a lever, $e^6$, pivoted to an arm on the plate $b^6$, or other suitable support, and urged upward by a spring, $f^6$. A vertical sliding rod, $g^6$, bears under the rear end of the lever and, extending downward through suitable guides on the frame, rests at its lower end on the rear extremity of a finger-lever, $h$, pivoted in the frame. When the front end of the finger lever or key is depressed, its rear end, lifting the rod $g^6$, actuates the lever $e^6$, depressing the slide $c^6$ and positively delivering a matrix from the tube. The slide carrying the matrix continues its movement downward beyond the end of the tube, so as to carry the matrix completely out of the tube into the guide below and in engagement with retaining devices, hereinafter explained.

To prevent the lower matrix from dropping out of the tube during the ascent of the delivery-slide, the tube is provided on its inner side face with a beveled shoulder, $i$, as shown in Fig. 12, to bear beneath the matrix, this side $j$ being hinged at $k$ and pressed inward, so that the matrix can only escape by riding outward over the lip $i$ and pressing the plate $j$ outward. The closure of the plate $j$ is effected by a spring, $l$, bearing on an arm projecting from the plate above its pivot, as in Fig. 11.

In order to prevent the matrices from following each other downward at improper times, the swinging plate $j$ is provided with a second arm, $m$, extending upward and inward through the side into the matrix-passage, as shown in Figs. 8 and 10. When the plate $j$ swings outward to permit the escape of the bottom matrix, the arm $m$ swings inward, and engaging the next matrix prevents its descent until the first has been entirely discharged and the plate $j$ closed to its normal position. The closure of the plate has the effect of withdrawing the arm $m$, so that the next matrix may descend to the place vacated by its predecessor.

The foregoing parts are all that are necessary for the proper delivery of the matrices. As it may sometimes occur that all the matrices in a given tube will be exhaused, it is desirable that the operator should be advised of this fact and prevented from operating the discharge-slide. To this end I provide the safety devices shown in Figs. 8, 9, 10, 11, 12, and 44. A small dog or stop, $n$, is pivoted to the plate $b^6$, so that when thrown outward it will stand beneath the lever $e^6$ and prevent its descent. A spring, $o$, tends to throw this dog outward into the path of the lever; but the lower end of the dog bears against the arm $p$, extending upward from the hinged plate $j$, and whenever the plate is held outward by the presence of a matrix within the arm $p$ acts to hold the dog out of action, so that the lever may descend. When, however, the matrices are exhausted and the plate $j$ urged inward by its spring, the arm $p$ releases the dog, so that it may act to arrest the lever. The essence of the invention in this regard resides in the use of a detent or stop to prevent the action of the feed devices, the detent being held out of action by means of a matrix within the magazine.

It will of course be understood that each of the key mechanisms above described is connected with an independent finger-key, so that the operation of any particular finger-key will be followed by the delivery of a matrix bearing a corresponding character.

*The matrix guide or conductor.*—Across the front of the machine, immediately below the mouths of the magazine-tubes and extending beyond the same toward the left, is a grooved rail guide or conductor, D, into which the matrices are delivered from the magazines, and through which they are successively advanced by an air-blast delivered through a pipe, E, to their point of assemblage at the left in essentially the same manner as in application Serial No. 196,270. This guide or channel, which is of a U form in cross-section, so that the matrices may stand in a substantially upright position therein with their shoulders resting on its upper edges, differs from that in my former application in that it is arranged in an inclined instead of a horizontal position. As shown in Fig. 1, it descends sharply toward the left. This inclination is advantageous not only in that it facilitates the descent of the matrices, allowing a weaker blast to be used with safety, but also in that it causes the matrices to assume more readily the required position therein, and also in that it admits of the magazine-tubes being gradually reduced in length toward the right side of the machine. This reduction in length is advantageous not only because of the diminished expense, but because it permits the use of a small number of matrices for those characters which are seldom used without the necessity of having the matrices fall a long distance when delivered from the distributing mechanism above. If long tubes were used with a small number of matrices in their lower ends, each matrix would acquire a considerable velocity in falling to its place in the tube. This would tend to the mutilation of the matrix.

At its lower end, beyond the magazine-tubes, the conductor D assumes a horizontal position, thus presenting a surface on which the matrices may be conveniently assembled in a compact line. This horizontal portion is also provided with a bottom opening, so that the space-bars may extend downward therethrough.

In order to prevent the blast from overturning or displacing the matrices in the guide or conductor D, I provided in my previous machine longitudinal bars or blades, which moved inward after the introduction of each matrix, engaging its edges so that it could not be lifted out of place. These bars were connected with and operated by the finger-keys. In order to avoid the expense and complication attending this construction, I now stretch longitudinally within the guide D one or more wires or cords, G, as shown in Figs. 1, 9, and 9ª, in suitable position to yield laterally and engage with the shoulders $f$ of the matrices as the latter are seated in place. These wires serve effectually to prevent the matrices from lifting out of place or from being overturned, but at the same time permit the matrix to slide freely along them through the guide to the place of assemblage. The essence of the invention in this regard consists in the use of one or more wires which will automatically engage with the matrices to hold them down in place in the guide, and it is manifest that to this end the wires may be placed in any suitable position, the shoulders of the matrices made of any appropriate form to engage therewith, and devices of any appropriate character used to sustain the wires and hold them under the proper tension. In connection with these wires it is to be noted that the delivery-slides of the magazines have movement sufficient to carry the matrices down into the guides and positively into engagement with the wires. The matrix, in passing from the magazine into the guide, lies against the upper or right hand side of the delivery-slide, and is held in contact therewith by the force of the blast.

*The blast.*—The air-blast delivered from the pipe E may be produced by means of a fan, an air-pump, or any other mechanism, of which there are several familiar to the skilled mechanic. In the present machine the blast is continuous. It is this fact, among others, which renders the use of the retaining-wires advisable in order that the matrices held in contact with the slides may be prevented from rising therewith.

*The space-bar delivery.*—For the purpose of delivering the space-bars one at a time to the line of matrices during the course of its composition, I provide a mechanism, H, located at the left of the magazine and immediately over the guide D. This mechanism is similar in its general construction to that represented in my preceding application, and serves to drop the bars one at a time into the guide or conductor immediately behind the matrix last added to the line. As its details form no part of the present invention and are fully described in application Serial No. 196,270, reference may be had thereto for a fuller description.

*Assembling and transferring mechanism.*—As the type and type-bars are moved to the left and brought successively upon the horizontal portion of the guide D, it is necessary that they shall be assembled in close order, and that when the line has reached the predetermined length it shall be transferred bodily to the left to the so-called "lifting devices," by which it is presented to the casting mechanism. The various parts for this end are fully illustrated in Figs. 1, 14 to 18, 49, and 50.

Pawls $r$, pivoted in the inner faces of the guide D, (see Fig. 6,) engage behind the successive matrices and space-bars as they are carried forward, thus preventing their rebound. Pawls $s$, pivoted to a power-driven constantly-vibrating arm, $t$, Figs. 6, 49, and 50, act against the successive matrices, and, adding them to the line in advance, force the whole line gradually ahead, making room between the rear end of the line and the pawls $r$ for the new matrices. The advance of the matrices is opposed by a yielding finger or resistant, $u$, which lies transversely across the guide D, being connected by a vertical pivot to a horizontally-sliding bar, $v$, and held normally in position by a pivoted latch, $w$, also carried by the slide $v$. The slide $v$ is mounted in a dovetailed groove on the rear face of the guide D, or otherwise supported, and is urged constantly backward toward the right by a spring, $x$, connecting it with a suitable part of the frame. Through this spring, the slide $v$, and the latch $w$ the detent $u$ is caused to bear forcibly against the front matrix, so that the series of matrices are held in compact order during their assemblage. As the matrices urge the detent $u$ forward step by step, its retreat is prevented by the forward end of the latch $w$ engaging teeth or serrations $y$ formed in the top face of the guide D. When the line of matrices has acquired the predetermined length, an arm, $z$, extending from the slide $v$, encounters conducting-fingers $a'$, closing an electric circuit, which rings an ordinary electric bell. In place of an electric bell an ordinary mechanical alarm may be used.

After the assemblage or composition of the line has been completed, it is desirable that it shall be transferred bodily to the left over the guide D and beyond the same into the lifting device I, which is slotted horizontally to receive it, and which constitutes, in effect, a temporary continuation of the guide D, as in my previous machine, and as hereinafter more fully explained. For the purpose of thus transferring the line of matrices, I employ, as shown in Figs. 4, 13, 15, 49, and 50, two vertically-swinging and laterally-moving arms, J and J', mounted on a horizontal shaft, K, lying above and in rear of the guide D. These arms stand normally in an elevated position at a distance from each other, as shown in Fig. 49, entirely clear of the other parts and inactive; but their forward ends are made of such form that when the arms are turned downward these ends will enter the slot or channel in the guide D at the respective ends of the line of matrices, so that the line, still sustained by the guide D, will be embraced or held between the two arms, as shown in Fig. 50. The arm-supporting shaft is mounted on a frame or block, L, arranged to slide horizontally in a dovetailed groove on the rear side of the guide D, as shown in Fig. 15, so that after the arms are turned down they may move bodily to the left to effect the movement of the matrices along the guide and into the lifting device.

The arm J is fixed rigidly in position on the shaft K, which is made of tubular form; but the arm J' is free to slide laterally on said shaft, without turning thereon, to a limited extent, and is urged toward arm J by a spiral spring, L'. A central spindle, M, connected with arm J' by a pin passing through a slot in the outer shaft, is arranged to encounter a fixed stop, N. When the parts are in their normal position, this stop acts, through the central spindle, to hold the arm J' backward against the action of the spring and to keep it separated from the arm J a sufficient distance to admit of the matrix-line passing between them. When, however, the arms J J' move to the left, the spindle M is relieved from the pressure of the stop N, and the spring L' immediately acts to force the arm J toward its companion, so that the line of matrices is pinched or clasped tightly between the two arms during their transfer.

To effect the lateral movement of the arms J J' and their supporting-slide, I connect the latter, as shown in Fig. 19, by one end to a link, O, which is attached to a strong spring, P, which tends to move the parts to the left. A pawl, Q, on the frame engages a shoulder on the slide L and holds the arms in their normal position; but a pin, R, bearing on this pawl, passes upward through the slide in such position that when the arm J is turned downward it depresses the pin and disengages the pawl, whereupon the spring P acts to move the parts to the left. In order to prevent a sudden and violent movement, I connect with the slide, as in Figs. 4 and 19, a piston, S, mounted in a cylinder, T, having a small air-inlet at its end. This contrivance serves as a suitable retarding mechanism. The arms J J' are held normally in their elevated position by means of a spring, U, connected to their shaft at one end, as shown at Figs. 49 and 50. Their depression is effected by means of a hand-lever, V, pivoted to the main frame and extended laterally at the upper end to bear against the rear faces of arms J J', as shown in Figs. 13, 14, 15, and 50. When depressed, the arms are locked down by a pawl, W, pivoted upon their slide and acted upon by a spring. As the arms complete their movement to the left and reach the point at which the matrices are to be left, they are arrested by the upright extension of the jaw or clamp H', Fig. 24, and the pawl W encounters a stationary pin, X, on the main frame and is thrown out of engagement thereby, whereupon the spring U immediately restores the arms to their upright position. Their lateral movement to their original position is secured, as in Fig. 19, by a cam-wheel, Y, acting on an arm of the lever O. Through these parts the slide L and the arms are moved gradually back to the right until the dog Q engages and holds them. Before the line of matrices can be moved to the left it is necessary to release the detent $u$, which bars their way. This is accomplished by the arm J' in its descent striking the rear end of the latch $w$ and unlocking the same from the detent. As the spring $x$ urges the slide bearing the detent constantly to the right, it follows that the detent on being unlatched will immediately swing to the left and pass backward to the right along the rear side of the matrices to a point near the pawls $s$. As the matrices are advanced to the left, the detent $u$ is thrown forward again across the guide D and locked by the latch $w$ in position to arrest the first matrix of the next succeeding line.

*Matrix-lifting head.*—The line of matrices is delivered, as before mentioned, from the ends of the rail D into the forked or slotted lifting-head I, in which they are sustained in substantially the same manner that they are sustained by the guide or conductor and in essentially the same manner as in my previous machine. In the former machine this lifting-head stood normally in line with the guide D, and in this position sustained the matrices directly in front of the mold. In the present machine I have placed the mold in a lower position than before, and I arrange the mechanism which operates the lifting-head in such manner that the head after receiving the matrices is first lowered to present them to the mold, and subsequent to the casting operation raised above its normal position to present the matrices to the distributing mechanism at the top of the machine. This lifting-head, which first lowers and then lifts the matrices, is an essential feature of the present invention. As shown in Figs. 1 and 3, the head is formed on one side with an extended plate dovetailed to receive the vertical stationary guide $x'$, on which it slides. It receives its vertical motion through a link, $y'$, from a vertically-vibrating arm, $z'$, which is in turn actuated by a cam-wheel, A', as shown in Fig. 3. In order that this arm may act to carry the lifting-head snugly to its place, both at the limit of its elevation and of its descent, and that the parts may be prevented from injury in the event of their meeting with resistance, I construct the link so that it retains normally a constant length, but that it may either lengthen or shorten under excessive strains. This link is shown in Fig. 26, in which $b'$ represents a tube provided with a fixed partition midway of its length. The upper end of the tube contains a spiral spring, $c'$, bearing on the head at the lower end of the plunger $d'$, the upper end of which is attached to the lifting-head, the spring tending to draw the plunger inward. The lower end of the tube contains a spring, $e'$, which bears against a plunger, $f'$, connected to the operating-lever $z'$. If this slide meets a resistance in its ascent, the spring $e'$ will yield, and thus allow the connection to shorten; or if, on the contrary, the head meets with opposition in its descent, the spring $c'$ will yield and allow the link to lengthen. The springs act, however, as described, to hold the plungers normally in the position shown, and insure the placing of the lifting-head in exact alignment with the guide-rail D when the matrices are to be transferred from the latter to the former.

*Clamping and casting mechanism.*—These parts are of the same general character and arrangement as those represented in my previous application.

B' represents the mold, consisting of a vertical disk having therethrough the slot or mold proper, $g'$, of a form and size corresponding with that of the required printing-bar. The wheel is mounted on a revolving horizontal shaft, C', sustained in a slide, D', mounted in the main frame and movable forward and backward in order to carry the face of the mold against the face of the matrices and to retract it therefrom.

E' represents the melting-pot, mounted in rear of the mold-wheel on guides which admit of its sliding horizontally. It has a pump or plunger, F', of ordinary construction, for delivering molten metal therefrom, and it has its delivery mouth or orifice arranged in position to close the rear face of the mold-opening $g'$ and deliver the molten metal therein. As in the former machines, the mold is closed during the casting operation by the mouth of the pot on one side and the row of matrices on the opposite side.

In the former machine I supported the matrices against the mold by a horizontally-movable head or clamp acting against their front edges and opposing the mold. I now employ, instead of a movable head, a stationary head or anvil, G', bolted or otherwise fixed rigidly to the main frame, its rear vertical face being at such distance from the mold-wheel as to admit of the matrices being lowered between them, as shown in Figs. 22 and 26.

In order to confine the matrices laterally, and to hold their side faces in intimate contact while being presented to the mold, I mount in the forward face of the anvil G' two horizontally-movable jaws, H', operated by a right and left hand screw, I', in the same manner that the clamping-jaws of my former machine were operated. It is in connection with these lateral clamps attached to the stationary head that the lowering of the matrices into position is of importance, for by this lowering action the matrices are properly introduced between the lateral clamps without the necessity of moving the latter forward out of their path, as is necessary when the matrices are introduced in a horizontal instead of a vertical direction. The shaft of the mold-wheel is provided with a pinion and a delay-surface, and receives an intermitting rotation from the wheel $J^6$, Fig. 22, having spur-teeth and a delay-surface, as shown. The mold-supporting plate is moved forward and backward by a bar, K', pivoted at one end thereof and pivoted at the opposite end to the middle of a horizontal lever, $L^5$, which is in turn pivoted at one end to the main frame and provided at its distal end with a stud or roller entering a cam-groove in the face of wheel $J^6$. The melting-pot is moved forward and backward, so as to bear against the mold-wheel and to assist in forcing the mold-wheel against the matrices by means of a toggle-joint, M', bearing a stud or roller actuated by a cam-groove in the under side of the wheel N'.

The rear end of the toggle-lever is seated in a horizontal slide, O', bearing against a lever, P', held in position by a spring, Q'. This arrangement forms a yielding support for the toggle-lever, so that, although it acts to force the pot and mold forward with strong pressure, it is enabled to yield and prevent breakage in the event of either of the parts meeting with undue resistance. As in the previous machine, the mold-wheel makes a half-revolution after the completion of each cast and the release of the parts, so that the casting in the mold is brought opposite a horizontal ejector-bar, R', which advancing forces the bar from the mold to the front of the machine. This ejector receives motion, as shown in Fig. 22, by a cam-wheel, $R^6$.

In order to insure the proper alignment of the matrices as the mold closes against them, the front of the mold is provided with a fixed rib, $k'$, which enters the notches in one side of the matrices.

In order that the lifting-head I may lower the matrices to the exact point required with reference to this aligning rib and to the mold proper, I provide an adjustable stop-screw, $l'$, mounted in the head I and bearing against a second stop-screw, $m'$, in the stationary clamp or abutment G'. The screw $m'$ is used simply to adjust the parts in assembling the machine, and being once adjusted it remains permanently in position. By adjusting the screw $l'$, the head may be stopped in its descent at a higher or lower point, as the character of the matrices may demand.

The mold-wheel is divided, as shown in Fig. $26^a$, into two parts separated by removable blocks $n'$, to produce the opening or mold proper between them. The parts are united, as shown, by screws, so that blocks $n'$, of different thicknesses, may be inserted in order to vary the width of the mold-opening and the thickness of the resulting type-bars. In this manner the machine may be adjusted to produce type-bars of different thicknesses adapted to bear characters of different styles or sizes, which may be produced by substituting for one set of matrices another bearing characters of appropriate form. The change in the thickness of the plates $n'$ will change the height of the aligning rib $k'$, and consequently the height at which the matrices are suspended in front of the mold; but the screw $l'$, by changing the point at which the lifting-head is stopped, compensates for this variation, so that the several parts will work in harmony.

The pump-plunger for delivering the molten metal is pivoted to a cross-lever, S', Fig. 1, which is pivoted at one end to the frame and connected at the opposite end by a rod, T', to a lever, U', which is forcibly depressed by a strong spring, V', seated between the lever and the bed-plate of the frame. This spring acts to depress the plunger and effect the expulsion of the metal.

The elevation of the plunger is effected by a cam-surface on the under side of the wheel W' acting on the rear end of lever U'.

*Justification.*—The mode of justification and the means employed therefor resemble strongly those of my former application, the space-bars being introduced between the matrices, transferred therewith to their position in front of the mold, and thrust upward simultaneously between the matrices after the lateral clamps are in position, so as to expand or elongate the line to the predetermined limit. In the former machine the entire justification was effected at one operation, and at a time when the aligning rib was seated in the matrices, so that there was a slight liability of the matrices binding in the lifting-head by which they were supported. To avoid this trouble I now divide the justification into two steps, first thrusting the space bars or wedges upward before the matrices are subjected to friction, so that the justification is nearly completed, after which they receive, in due time, a second and final movement, completing the justification and forcing the matrices tightly together.

The invention consists particularly in a mechanism for advancing the space-bars by two successive steps; but I prefer to employ the particular devices represented in Figs. 1, 24, and 25.

$N^2$ represents a small frame arranged to slide vertically in a larger frame, $O^2$, which is also arranged to slide vertically in suitable grooves in the main frame. A weighted chain, $P^2$, attached to the lower end of the secondary frame, passes over a pulley, $Q^2$, on the outer frame and tends to urge the inner frame upward with reference to the outer. Hooks $R^2$, attached to the outer frame, engage the top of the inner frame to pull the same downward, being thrown into engagement by springs $S^2$. The hooks $R^2$ have heel projections at their lower ends, and when the two frames are carried upward together these heel projections are engaged by hooks $T^2$ on a stationary part of the frame, whereby the hooks $R^2$ are disengaged and the inner frame released, so that it may be moved upward with reference to the outer frame by the weight before mentioned. A large lever, $U^2$, pivoted in the base of the main frame, is connected at one end by a link to the outer frame, $O^2$, and is provided at the opposite end with a large weight, $V^2$. At a suitable point in its length this lever is provided on one side with a stud or roller, $W^2$, which bears on a cam-track formed on the top of the cam-wheel W', before referred to, this cam acting to overcome the weight and operate the lever in such manner as to depress the two frames of the justifying device. After the matrices are in position in front of the mold, and before the parts are closed tightly together, the cam permits the lever $U^2$ to rise and lift the outer frame, $O^2$, until the hooks $R^2$ $T^2$ release the inner frame, whereupon the inner frame rises and lifts the space-bars until they have nearly completed the justifying operation. As this takes place at a time when the matrices are comparatively free, it may be effected by a very light weight without straining the parts and without subjecting either the matrices or the space-bars to undue wear or friction. In due time, after the other operations have progressed and when the aligning rib has entered the matrices, the lever $U^2$ continues its ascent, carrying the outer frame, $O^2$, upward until it encounters the top of the inner frame, when it acts to positively lift the latter, the two frames rising together and forcing the space-bars tightly to their places. As the outer frame ascends to complete the justification, the hooks $R^2$ can engage the inner frame, which is carried downward with the outer frame when the latter descends, which occurs after the completion of the casting operation through the influence of the lever $U^2$ and its actuating-cam.

*Dressing castings.*—As a precautionary matter, to remove from the castings automatically any burrs, fins, or projections which may chance to exist thereon when they are delivered from the mold, I provide a mechanism for planing and shaving their two side faces. This mechanism is plainly shown in Figs. 22, 26, and 27. Immediately in front of the mold-wheel there are two horizontal plates, $o'$, with sharp edges at the rear. These plates are in such position and at such distance apart that the type-bar passes between them as it leaves the mold, their edges removing any large projections or irregularities. The upper plate extends beyond the lower, and the casting is forced upward and held snugly against the same by an underlying plate, $p'$, supported by springs, this arrangement guiding the type-bars in a definite line as they advance.

In front of the above parts, at a short distance therefrom, in order to leave space for the escape of the burrs and shavings, there are two stationary cutting-blades, $q'$, which act on opposite faces of the type-bars to dress them accurately to the required thickness as they pass between them. Immediately in front of these stationary knives there is a receiving-plate, $s'$, upon which the type-bar is finally delivered and by which it is to some extent guided in its passage between the cutters. This plate $s'$ is operated by a connection to an arm projecting from the justifying-frame, so that when the latter rises the receiving-plate lifts the type-bar into the receiving-galley $u'$, standing above it, the galley being provided, as in my previous case, with spring-latches at the side to retain the successive type-bars as they are added to the foot of the column therein.

*Distributing mechanism.*—The distributer proper consists, as in my former application, of a single bar of metal provided with longitudinal teeth to engage the teeth in the upper ends of the matrices and hold the latter in suspension as they are advanced along the rail over the magazine-tubes. The teeth are modified in form and arrangement at different points in the length of the bar, according to the teeth of the respective matrices, so that a matrix is held in suspension until it reaches the proper tube, whereupon its teeth disengage from the bar, allowing the matrix to fall into the tube.

The present improvements relate more particularly to the device for lifting the matrices one at a time to the distributer-rail and moving them to cause their engagement therewith. These features are shown more particularly in Figs. 28 to 32, and 35 to 38. The lifting-head I elevates the matrices, as in the previous machine, from the casting mechanism to the level of the stationary rails $A^2$, to which they are transferred by a horizontal slide, $B^2$, connected to a lever, $C^2$, and urged constantly inward by a spring in essentially the same manner as in the original machine. I now provide, in addition to the slide $B^2$, a second slide, $E^2$, provided with pawls $F^2$, between which the matrices are advanced, and which will engage automatically behind the matrices, as shown in Figs. 33 and 34. This second slide is for the purpose of urging the line of matrices forward toward the devices by which they are fed to the distributer during the time that the main slide $B^2$ is retracted in position to admit another line of matrices in front of it. The second slide is connected by a rod, $F^3$, to a retracting lever, $G^2$, and is urged constantly inward by a spring. The two levers are operated and their slides retracted alternately by means of appropriate cams on the main shaft. The stationary rails $A^2$, to which the matrices are transferred, terminate immediately in advance of a vertically-reciprocating slide, $H^2$, mounted in a stationary support and operated by pitmen $I^3$ from a crank, $J^2$, mounted in the top of the distributer-frame and driven continuously. This slide $H^2$ is recessed in its front face in the manner shown in Fig. 42, its upper end being adapted to receive a single matrix at a time, while its lower portion is adapted to receive a space-bar. If a matrix be at the forward end of a line, it will be forced by the pressure behind into the upper end of the slide when the latter is lowered, as in Fig. 41, and when the slide rises it will carry the matrix upward therewith until its upper toothed end straddles the distributer $J^5$. If, now, a space-bar is next in the line, it will, as the slide completes its upward movement, fall into the lower portion of the same, as shown in Fig. 41, so that when the slide descends the space-bar will be carried downward. Thus it will be seen that the slide serves the double purpose of carrying the matrices upward and the space-bars downward. The width of the matrices is such as to prevent them from passing into the opening for the space-bars, which are of less width at the upper end, and, on the other hand, the length and shape of the space-bars are such that they cannot fall into the cavities intended for the matrices. Each matrix is lifted to the distributer rail or bar $J^5$ at a point where the latter is free from teeth or toothed in such manner that the matrices will not engage therewith until they have been moved horizontally. In order to sustain the matrices while they are being thus moved horizontally to engage the teeth of the rail and to allow the slide $H^2$ to descend in the meanwhile for another matrix, I make use of a horizontal slide, $I^2$, having one end forked, as shown in Figs. 35 and 37, that it may straddle the upper ends of the matrices. The inner faces of the arms of this slide have ribs tapered longitudinally toward the left, and the slide is reciprocated through an intermediate link by a lever, $K^2$, pivoted to the frame and actuated by a cam-groove, $L^2$, in a suitable wheel. At the instant when the matrix is lifted the slide stands in its forward position, so that the matrix, ascending between its arms, passes behind and to the left of the ribs. As soon as the matrix reaches its full elevation, the slide moves to the left, and its ribs entering the notches in the upper edges of the matrix give support thereto, holding it astride the rail while the slide descends.

To carry the matrices along the rails, I use, as in the previous machine, a series of carrier-plates, $M^2$, attached to an endless band or chain traveling about suitable guide-pulleys. In the former machine these plates were provided with depending pins to act upon the matrices and carry them forward. In place of these pins I now substitute sheet-metal plates $N^3$, which have slots punched therein. These plates $N^3$ are bent, as shown, and attached to opposite edges of the main plates $M^2$, as shown, so that they will embrace the edges of the intervening matrices and carry them along the rail. The form of the slotted plates is plainly shown in Fig. 43.

In order to offer ample time for each matrix to drop into its appropriate tube when released, and to insure a proper position of the carrying-plates $M^2$ as each matrix is lifted thereto, I propose to impart to the carrier-plates $M^2$ a step-by-step motion. This may be effected by various mechanisms; but I recommend as the most simple device for the purpose a pinion, $O^3$, such as shown in Fig. 32, arranged to act in teeth formed on the under outer faces of the plates $M^2$. This pinion being revolved continuously, each of its teeth engages and moves the plate before the next tooth comes into action, a constantly-rotating pinion thus imparting an intermitting motion to the plate and carrier. The pinion is commonly attached to or formed upon the horizontal shaft of the gear-wheel $P^3$, in which the cam-groove $E^2$ is formed. This wheel receives motion in turn from a pinion, $Q^3$, on the shaft of the crank $J^2$, the same shaft being provided with a band-wheel, $R^3$, through which it receives motion.

In order to keep the surfaces of the matrices clean and insure a close contact between them, I mount in a stationary plate, $T^3$, facing the lifting-slide $H^2$, felt or other suitable wipers, $U^3$, against which the matrices are carried during their ascent.

The distributer-rail, which may be in all respects identical with that in my former application, need not be further described herein. Below this rail and above the mouths of the magazine-tubes I place an insulated frame, $V^3$, containing a series of vertical partitions, $W^3$, which divide the interior of the frame into a series of vertical openings registering with the mouths of the tubes. Each of these partitions is pivoted at its lower end, and is acted upon by a spring, $X^3$, Figs. 38 and 1, which allows its upper edge to yield toward the right. In the event of a matrix falling before being completely disengaged from the distributer, or of its dropping down into contact with one of its partitions while being carried forward, the partition will yield, and thus prevent breakage of the parts. It will also serve, if the matrix is soon released, to guide it into the proper tube, instead of allowing it to fall into the next succeeding tube, as it would otherwise be liable to do.

*Stop mechanism.*—In order to effect automatically the stoppage of the distributer in case of a matrix failing to be properly discharged, or of its lodging between the carrier and the upper ends of the magazine-tubes, I transmit motion to the distributer through a clutch which is controlled by an electro-magnet. One pole of the magnet will be connected to the frame $V^3$, and the opposite end connected to the distributer-frame, and under the normal condition of the parts the circuit will be open between the distributer and the frame $V^3$. If, however, a matrix lodges between these parts, it will, being a conductor, complete the circuit and cause the magnet to disengage the clutch. This clutch mechanism is plainly shown in Figs. 45 and 46, in which $Y^2$ represents the driving-shaft; $Z^2$, a loose pulley thereon, from which a belt is extended to the distributer-driving pulley; and $A^3$ is a clutch which may be of the form shown or of any other appropriate form.

$B^3$ represents the electro-magnet, and $C^3$ an angular lever having at one end an armature in the field of the magnet, and at the other end one or more pins to effect the disconnection of the clutch whenever the magnet attracts the armature in consequence of the circuit being closed through a lodged matrix, as before explained.

*Safety devices.*—To prevent the operation of the transfer-slide $B^2$ when the head I is not in proper position, I may employ the device shown in Figs. 19, 47, and 48, in which $D^3$ represents a horizontally-movable lever for throwing out of action the clutch which drives the casting and elevating mechanism.

$E^3$ is the cam-wheel, through which the lever $G^2$, operating the transfer-slide, is controlled. Adjacent to the rim of this cam there is a small plate or segment, $F^3$, attached to an upright spindle, $G^3$, and lifted by a spiral spring, $H^3$, so that its edge stands normally above the upper edge of the cam. The spring which tends to advance the transfer-slide is of such strength as to overcome the spring $H^3$, so that the resistance of the lever $G^2$ will effect the depression of the segment $F^3$ and its spindle $G^3$ when the parts are in proper operative condition. If, however, the transfer-slide encounters a resistance, the lever $G^2$ will be prevented from depressing the segment $F^3$, and the segment will remain in its elevated position. The lower end of the segment-spindle $G^3$ is notched transversely in one side, and when it is in its normal or depressed position and being advanced with the revolving wheels the notched edge will admit the trip-lever $D^3$ without actuating the same; but if the spindle is in its elevated position the notch will no longer be in line with the lever, and consequently the periphery of the spindle will strike the lever, and, moving the same backward, disengage the clutch and stop the machine.

*Driving-clutch.*—The main shaft $H^4$, on which all the operating-cams are mounted, receives motion, as in the former machine, through a worm-wheel on its lower end from a worm $I^3$. This worm-wheel is mounted on a short shaft driven from a continuously-rotating shaft, $J^3$, through a clutch now to be described. A non-rotating sleeve, $K^3$, is swiveled at its forward end to a plate, $L^3$, carrying two pins, $M^3$, which project through a cross-arm fixed in the end of the shaft. The opposing end of the driving-shaft $J^3$ carries a head, $N^4$, containing two dogs or pawls, $O^4$, pivoted to swing outward, as in Fig. 20, beyond the face. The dogs are urged inward by springs. When the sleeve $K^3$ is retracted, it acts through the plate $L^3$ to withdraw the pins $M^3$ and uncouple the clutch. The moment that the driving-pins are disengaged the pawls $O^4$ are thrown backward into the head entirely clear of the driving-pins, so that the one part of the clutch may revolve past the other without contact therewith and without the clicking or rattling sound which is incident to ordinary clutches. When the pins $M^3$ are thrown forward and engage the pawls $O^4$, the latter swing outward under the pressure, thus affording a firm hold between the parts. The clutch is thrown into action when released by a spring, $P^4$, urging the sleeve forward. The sleeve is moved to disengage the clutch by a pawl, $Q^4$, on the trip-lever $D^3$, the lever being actuated automatically at suitable times by a pin on one of the wheels, as in the previous machine. The clutch stands normally out of engagement, as shown in Fig. 19. It is thrown automatically into action to start the casting mechanism through a lever, $R^5$, engaging the pawl $Q^4$ and fixed on a vertical shaft carrying an arm, $R^4$, arranged in position to be acted upon by the sliding shaft K, or other suitable part of the mechanism employed to transfer the matrices to the casting mechanism, so that the transfer of the matrices effects the starting of the casting mechanism.

It will be understood from the preceding description that when the bolt $Q^4$ is disengaged the clutch is actually engaged by the spring $P^4$.

*Operation.*—On the power being applied to the main shaft the entire distributing mechanism receives a continuous motion; but the casting and clamping appliances remain at rest. The operator touches in proper sequence the finger-keys representing the required letters or characters and the intermediate spaces, and as a result the matrices are forced downward from the magazine-tubes into the conductor D and retained by the wires. The space-bars are also dropped in position in like manner. The air-blast drives the matrices and space-bars forward in connection with the pawls and assembles them on the horizontal end of the guide D. When the line is complete, the operator depresses the arms J J', and the matrices and space-bars are transferred to the lifting-head I and the casting and clamping mechanism set in motion; the matrices are lowered to the mold, the mold and melting pot advanced, and the pump actuated to fill the mold; the pot and mold retreat; the mold-wheel makes a half-revolution; the ejector delivers the bar from the mold between the finishing-knives to the receiving-plate; the lifting-head carries the matrices upward, and the horizontal slides deliver them to the vertical slide, which drops the space-bars downward and carries the matrices upward to the distributer-rail, along which they are moved until they enter the proper magazine-tubes.

I do not claim herein the manner of seating the magazine-tubes in their supporting-frame to admit of their individual removal, nor the bar by which they are all locked in place, as these features will be separately claimed in an application now prepared and to be immediately filed.

Having thus described my invention, what I claim is—

1. In combination with the magazine-tube, the vertical slide provided with the finger to engage and discharge the matrices.

2. In combination with the series of magazine-tubes, each provided with a longitudinally-movable slide to deliver the matrices endwise therefrom one at a time, the guide or conductor D, extending past the mouths of the tubes and presenting an open side to receive the matrices.

3. In combination with the magazine-tube, the vertical discharging-slide, the guide or conductor thereunder, and the longitudinal wire therein to retain the matrices delivered by the slide.

4. The magazine-tube, in combination with the discharging-slide and the yielding side or mouth-plate to prevent the escape of the bottom matrix in advance of the action of the slide.

5. The magazine-tube, in combination with the discharging-slide, the yielding mouth-plate, and the upper arm on said plate to arrest and temporarily sustain the upper matrices.

6. The magazine-tube, in combination with the discharging-slide, its actuating lever, a stop to prevent the action of the lever, and means, substantially as described, to hold the stop out of action when the tube contains a matrix.

7. The discharging-slide and its actuating-lever, in combination with the stop for said lever, the spring tending to throw the stop into action, and the yielding side plate provided with the arm whereby the stop is held out of its active position by means of a matrix within the magazine, whereby the discharging devices are prevented from working when the magazine is empty.

8. The upright magazine-tube, its vertical slide to deliver the matrices, the slide-actuating lever pivoted at a middle point, the finger-key or lever, also pivoted at a middle point, the intermediate rod communicating motion from the key to the lever, and the lifting-spring to restore the slide to its normal position, said elements combined substantially as described.

9. The series of vertical magazine-tubes terminating in a line oblique to the horizon, the open inclined trough or conductor beneath their mouths, the vertical discharge-slides, the slide-actuating levers, the finger-key levers mounted in a horizontal bank below the conductor, and the rods $g^6$, rising from the key-levers to the slide-actuating levers, as described, whereby the action of the keys is caused to deliver the matrices endwise in an upright position into the conductor, said elements combined substantially as described.

10. In combination with the magazine-tubes having their lower ends terminated at different heights, as described, the matrix guide or conductor arranged in an inclined position thereunder and in proximity thereto, whereby the tubes are enabled to deliver all the matrices endwise in an upright position into the conductor.

11. The open matrix guide or channel D, adapted to maintain the matrices in an approximately vertical position and inclined downward in the direction of the matrix-delivery, in combination with a blast-tube to direct a current of air downward longitudinally therethrough.

12. In combination with the magazine-tubes, the guide or conductor D, lying at one end in an inclined position beneath the tubes, but extended at the opposite end beyond the tubes in a horizontal position.

13. In combination with the matrix guide or conductor D, one or more wires stretched longitudinally therein to engage the matrices and retain them in position while they are passing through the conductor.

14. In combination with the guide or conductor D, to maintain the assembled matrices, the resisting-finger $u$, pivoted to its carrier to swing horizontally out of the path of the matrices, whereby they are permitted to advance past the same when required.

15. In combination with the conductor D, to sustain the matrices, the horizontally-swinging resistant *u*, its carrying-slide, and the latch to hold it normally in position across the conductor.

16. The conductor or guide D, in combination with the resistant *u*, the slide to which it is pivoted, the latch to hold the resistant, and the spring tending to move the slide and to hold the resistant against the advancing matrices.

17. The guide D, in combination with the pivoted resistant *u*, its sustaining-slide *v*, the spring *x*, to move the slide, and the latch *w*, engaging the guide D to hold the slide, and also engaging the resistant *u*, as described, whereby the latch is caused to lock the resistant from turning, and also to hold the slide and resistant as they are advanced step by step and prevent them from retreating.

18. In combination with the guide or conductor D to sustain the assembled matrices, the vertically and laterally movable arms J J', for transferring the matrices laterally.

19. In combination with the guide D, a horizontal slide, the two vertically-swinging arms J J', carried by said slide, the spring tending to close said arms together, and means, substantially as described, for maintaining the separation of the arms until they descend to grasp the matrices.

20. The arm J and its tubular shaft, in combination with the loose arm J', the spring L', the spindle to hold arm J' backward against the action of the spring, and the stop to actuate the spindle.

21. As a means of clamping and transferring a line of assembled matrices, the guide or conductor D, in combination with the laterally-movable arms J J', substantially as described, to grasp the assembled matrices between them, and a slide or support whereby the arms are sustained and permitted to move laterally with the matrices.

22. In combination with the matrix-clamping vertically-swinging arms J J', their sustaining-slide, the spring to move the slide, the dog or pawl to prevent its movement, and means, substantially as described, whereby the arms in descending to grasp the aligned matrices are caused to disengage the dog, so that the arms may move laterally while holding the matrices.

23. In combination with the matrix-clamping arms J J' and their sustaining device, substantially as described, the spring to raise them and hold them normally in an elevated position.

24. The arms J J', their sustaining-slide, and their lifting-spring, in combination with the pawl or latch to hold them down.

25. In combination with the arms J J', their lifting-spring, and the latch to hold them down, the fixed pin or arm to disengage the latch when the arms complete their lateral movement.

26. In combination with a guide or conductor, D, to sustain the assembled matrices, a movable carrier having two arms, as J J', to grasp and transfer the assembled matrices, and the spring to advance said carrier, substantially as described.

27. In combination with a carrier having arms, as J J', substantially as described, to grasp the assembled matrices, a spring to advance the carrier in one direction and a cam mechanism, substantially as described, for positively returning the carrier to its normal position.

28. In combination with the matrix guide or conductor and the spring-actuated carrier to advance the assembled matrices, the pawl or dog Q, to retain the carrier in position against the influence of the spring.

29. The pivoted resistant *u*, to oppose the advance of the matrices, its retracting-spring, and the latch to hold the resistant in operative position, in combination with the horizontally-movable carrier-arms arranged to unlatch the resistant as they grasp the matrices, whereby the resistant is permitted to retreat past the side of the matrices as they are carried forward.

30. In combination with the guide D, on which the matrices are assembled, the mold located at a different level and the vertically-movable head or yoke I, for presenting the matrices to the mold.

31. In combination with the guide or rail D, on which the matrices are assembled in line, the mold at a lower level, the distributing mechanism at a higher level, the head or carrier I, and operating mechanism, substantially as described, whereby said head is caused to lower the matrices to the mold and subsequently lift them to the distributer.

32. The stationary head or abutment and its laterally-movable jaws, in combination with a vertically-movable head or lifter whereby the assembled matrices are placed between the jaws.

33. The stationary head and its laterally-movable jaws, in combination with a vertically-movable head or lifter to place the assembled matrices between the jaws, and the mold movable to and from the abutment to effect the clamping of the intermediate matrices.

34. In combination with the stationary clamp and the laterally-acting jaws, the movable mold-wheel, the movable melting-pot, and means, substantially as described, for lowering the aligned matrices to their operative positions between the mold and clamps.

35. The mold and the distributing mechanism at a higher level, in combination with the guide D, at an intermediate elevation, and a lifting-head, I, whereby the matrices are first lowered to the mold and subsequently raised to the distributer.

36. In combination with the lifting-head I and the arm or lever for actuating the same, the intermediate spring-link adapted, as described, to be lengthened or shortened by excessive strains.

37. In combination with a lifting head, I, and an arm or actuating device, $z'$, the spring-link consisting of the body, the two plungers or pistons bearing normally against a solid stop, and the two springs, applied as described, to resist the outward movement of one piston and the inward movement of the other.

38. The lifting head I, the yielding link, the actuating-lever, and the cam acting to move said lever positively in both directions, said elements combined for joint operation, substantially as described.

39. In combination with the mold and the movable head or carrier I, for presenting the matrices thereto, the adjustable stop to limit the movement of the head, and thus insure the presentation of the matrices in the precise position demanded.

40. In combination with the mold, the plates $o'\ o'$ and the knives $q'\ q'$, arranged adjacent thereto to act upon the bars or castings as they leave the mold.

41. In combination with the knives $q'\ q'$, the plates $o'\ o'$ and the spring-supporting plate $p'$, to assist in guiding the bars or castings as they are passed between the knives.

42. In a mechanism for operating the space-bars to justify the line, the combination of a slide for lifting said bars and means, substantially as described, for advancing said slide by two distinct movements—the first to advance the space-bars nearly to their operative positions and the other to complete the movement.

43. In combination with the slide to actuate the space-bars, the small weight to cause its preliminary advance and the large weight and its connections to cause the final advance.

44. The slide $O^2$ and its actuating-lever $U^2$, provided with a heavy weight, in combination with the secondary frame $N^2$, carried by the first, the weighted chains connecting the two frames and urging the secondary frame upward with respect to the other, the hooks to hold the secondary frame down, and means, substantially as described, for tripping said hooks.

45. In a mechanism for actuating justifying-slides such as herein described, a vertically-movable slide, mechanism for moving the same up and down, a second slide therein, intermediate devices, substantially as described, urging the second slide upward, locking devices, substantially as described, to hold it downward and to draw it downward after its elevation, and a trip to disengage said locking devices as the main slide rises, and thus permit the elevation of the secondary slide, said elements constructed and combined for joint operation.

46. In combination with the matrix-lifting head I and the elevated receiving-rails $A^2$, the two transfer-slides $B^2$ and $E^2$ and means, substantially as described, for actuating them.

47. In combination with the receiving-rails $A^2$, the slide $B^2$, the slide $E^2$, and its pawls, the levers and cams to retract the slides alternately, and springs acting to urge the slides forward, whereby the matrices are transferred to the rails and pushed constantly toward the distributer.

48. The slide $H^2$, provided with separate recesses to receive the matrices and the space-bars, whereby the two are carried in opposite directions.

49. In combination with the rails $A^2$, to sustain the matrices and intermediate space bars, the slide $H^2$, movable past the end of the rail and recessed to receive the matrices and space-bars in its face, substantially as described.

50. The slide or carrier bar to carry the single matrices, as described, in combination with the wiper lying adjacent thereto to act upon the matrices.

51. In combination with the mold and the distributer and mechanism, substantially as described, for transferring the matrices from one to the other, a wiper located at an intermediate point to clean the surfaces of the matrices before they reach the distributer, said parts constructed and arranged substantially as described.

52. In combination with the distributer-rail and the slide for lifting the matrices thereto, the horizontal slide to sustain the matrices while moving horizontally into engagement with the rail.

53. In combination with the distributer-rail toothed or ribbed longitudinally, as described, the slide having the inside ribs to enter and temporarily sustain the individual matrices, and a carrier, substantially as described, to advance the matrices lengthwise of the slide and rail.

54. In combination with the toothed carrier-plates for advancing the matrices along the distributer-rail, the pinion, as described and shown, engaging said teeth, whereby the plates receive an intermitting motion.

55. In combination with the bodies of the carrier-plates, the slotted metal plates $N^3$, formed and applied thereto substantially as described, whereby they are adapted to engage the edges of the matrices.

56. In a mechanism for the distribution of metallic matrices, the distributer, its driving-clutch, and the magnet to disengage the clutch, in combination with the insulated frame $V^3$ and an electric circuit embracing the magnet and connected at its terminals to the distributer and the frame $V^3$, respectively, whereby the lodgment of a matrix will cause the circuit to be completed therethrough and the distributer to be stopped.

57. In combination with a distributing mechanism, a magnetically-controlled clutch to operate the same and a normally-open electric circuit to control said clutch, said circuit having its terminals arranged in the path of the type delivered by the distributer, whereby the lodgment of the type between said terminals will close the circuit and cause the stoppage of the distributing mechanism.

58. In combination with the distributer-rail and means, substantially as described, for advancing the matrices along the same, the magazine-tubes thereunder and the intermediate pivoted plates, $W^3$, and their actuating-springs.

In testimony whereof I hereunto set my hand, this 12th day of July, 1886, in the presence of two attesting witnesses.

OTTMAR MERGENTHALER.

Witnesses:
EDWARD RAINE,
E. F. LEGH.